(12) United States Patent
Brunel et al.

(10) Patent No.: US 8,396,031 B2
(45) Date of Patent: Mar. 12, 2013

(54) METHOD FOR ALLOCATING, BY A TELECOMMUNICATION DEVICE, AT LEAST A CHANNEL ELEMENT OF A GROUP OF CHANNEL ELEMENTS OF A CHANNEL RESOURCE TO A DESTINATION

(75) Inventors: Loic Brunel, Rennes Cedex (FR); Damien Castelain, Rennes Cedex (FR); Nicolas Gresset, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 516 days.

(21) Appl. No.: 12/665,060

(22) PCT Filed: Jun. 16, 2008

(86) PCT No.: PCT/EP2008/057535
§ 371 (c)(1),
(2), (4) Date: Dec. 17, 2009

(87) PCT Pub. No.: WO2008/155307
PCT Pub. Date: Dec. 24, 2008

(65) Prior Publication Data
US 2011/0164575 A1    Jul. 7, 2011

(30) Foreign Application Priority Data
Jun. 18, 2007   (EP) ..................................... 07011865

(51) Int. Cl.
*H04W 4/00* (2009.01)
*H04J 3/16* (2006.01)
(52) U.S. Cl. ......................................... 370/329; 370/468
(58) Field of Classification Search .......................... None
See application file for complete search history.

(56) References Cited

U.S. PATENT DOCUMENTS

| | | | |
|---|---|---|---|
| 6,657,949 B1 * | 12/2003 | Jones et al. | 370/205 |
| 2002/0054585 A1 * | 5/2002 | Hanada et al. | 370/342 |
| 2002/0167992 A1 | 11/2002 | Das et al. | |
| 2003/0147422 A1 | 8/2003 | You et al. | |
| 2003/0161471 A1 | 8/2003 | Jou et al. | |
| 2005/0128993 A1 * | 6/2005 | Yu et al. | 370/342 |

(Continued)

FOREIGN PATENT DOCUMENTS

| | | |
|---|---|---|
| EP | 1 300 978 | 4/2003 |
| WO | 03 065618 | 8/2003 |

(Continued)

OTHER PUBLICATIONS

U.S. Appl. No. 12/595,966, filed Oct. 15, 2009, Gresset, et al.

*Primary Examiner* — Eunsook Choi
(74) *Attorney, Agent, or Firm* — Oblon, Spivak, McClelland, Maier & Neustadt, L.L.P.

(57) ABSTRACT

The present invention concerns a method for allocating, by a telecommunication device, at least a channel element of a group of channel elements of a channel resource to a destination. Each channel element is a predefined subdivision of the channel resource. The telecommunication device: determines the number of channel elements to be allocated to the destination; selects at least one randomization function according to the number of channel elements to be allocated to the destination; processes the data to be included in the or each channel element to be allocated to the destination by the at least one selected randomization function; transfers the data processed by the at least one selected randomization function by mapping the data processed by the at least one randomization function on the at least one channel element.

19 Claims, 8 Drawing Sheets

|  | 800 | 801 | 802 | 803 | 804 | 805 | 806 | 807 | 808 | 809 | 810 | 811 | 812 | 813 | 814 | 815 | 816 | 817 | 818 | 819 | 820 |
|---|---|---|---|---|---|---|---|---|---|---|---|---|---|---|---|---|---|---|---|---|---|
| CCE1 | X |  |  |  |  |  | X |  |  |  |  |  | X |  |  |  | X |  | X |  | X |
| CCE2 |  | X |  |  |  |  | X | X |  |  | X | X |  |  | X | X |  | X | X |  | X |
| CCE3 |  |  | X |  |  |  | X | X |  |  | X | X | X | X | X | X | X | X | X | X | X |
| CCE4 |  |  |  | X |  |  |  |  | X | X | X | X | X | X | X | X | X | X | X | X | X |
| CCE5 |  |  |  |  | X |  |  |  | X | X |  | X | X |  | X | X | X | X | X | X | X |
| CCE6 |  |  |  |  |  | X |  |  |  | X |  |  | X |  | X |  | X |  | X | X | X |

U.S. PATENT DOCUMENTS

| | | |
|---|---|---|
| 2006/0045169 A1 | 3/2006 | Kim |
| 2007/0047513 A1 | 3/2007 | Anderson |
| 2007/0071118 A1* | 3/2007 | Sydir et al. .................... 375/260 |
| 2007/0149242 A1* | 6/2007 | Kim et al. .................... 455/525 |
| 2007/0189149 A1* | 8/2007 | Terabe .......................... 370/208 |
| 2007/0237246 A1* | 10/2007 | Lim et al. ..................... 375/260 |
| 2008/0317152 A1* | 12/2008 | Sun et al. ..................... 375/261 |
| 2010/0046413 A1* | 2/2010 | Jin et al. ....................... 370/315 |

FOREIGN PATENT DOCUMENTS

| | | |
|---|---|---|
| WO | 2006 026429 | 3/2006 |
| WO | 2007 023044 | 3/2007 |

\* cited by examiner

|  | | UE1 | | UE2 | |
|---|---|---|---|---|---|
|  | | 407 | 408 | 409 | 410 |
| 400 | Data | 001 | 001 | 010 | 010 |
| 401 | Mask | 001 | 001 | 011 | 011 |
| 402 | Result | 000 | 000 | 001 | 001 |

| 403 | UE2 Mask 1 | 110 | 110 | 110 | 110 |
|---|---|---|---|---|---|
| 404 | Result | 110 | 110 | 111 | 111 |

| 405 | UE2 Mask 2 | 011 | 011 | 011 | 011 |
|---|---|---|---|---|---|
| 406 | Result | 011 | 011 | 010 | 010 |

Fig. 4

|  | | UE1 | | UE2 | |
|---|---|---|---|---|---|
|  | | 507 | 508 | 509 | 510 |
| 500 | Data | 001 | 001 | 010 | 010 |
| 501 | Mask | 101 | 001 | 111 | 011 |
| 502 | Result | 100 | 000 | 101 | 001 |

| 503 | UE2 Mask 1 | 100 | 011 | 110 | 111 |
|---|---|---|---|---|---|
| 504 | Result | 000 | 011 | 011 | 110 |

| 505 | UE2 Mask 2 | 010 | 000 | 111 | 011 |
|---|---|---|---|---|---|
| 506 | Result | 110 | 000 | 010 | 010 |

Fig. 5

|  | UE1 | | UE2 | |
| --- | --- | --- | --- | --- |
|  | 611 | 612 | 613 | 614 |
| 600 — Data | 0001 | 0001 | 0010 | 0010 |
| 601 — Mask | 1101 | 1001 | 0111 | 0011 |
| 602 — Result | 1100 | 1000 | 0101 | 0001 |

| 603 — UE2 Mask 1 | 1100 | 1100 | 1100 | 1100 |
| --- | --- | --- | --- | --- |
| 604 — Result | 0000 | 0100 | 1001 | 1101 |

| 605 — UE2 Mask 2 | 0111 | 0011 |
| --- | --- | --- |
| 606 — Result | 0111 | 1011 |

| 607 — UE2 Mask 2 | | 0111 | 0011 |
| --- | --- | --- | --- |
| 608 — Result | | 1111 | 0110 |

| 609 — UE2 Mask 2 | | | 0111 | 0011 |
| --- | --- | --- | --- | --- |
| 610 — Result | | | 0010 | 0010 |

Fig. 6

|  | | UE1 | | UE2 | |
| --- | --- | --- | --- | --- | --- |
|  | | 711 | 712 | 713 | 714 |
| 700 | Data | 0001 | 0001 | 0010 | 0010 |
| 701 | Mask | 1101 | 1001 | 0111 | 0011 |
| 702 | Result | 1100 | 1000 | 0101 | 0001 |

| | | | | | |
| --- | --- | --- | --- | --- | --- |
| 703 | UE2 Masks 1 | 1100 | 0101 | 0110 | 1111 |
| 704 | Result | 0000 | 1101 | 0011 | 1110 |

| | | | | | |
| --- | --- | --- | --- | --- | --- |
| 705 | UE2 Mask 2a | 0110 | 0011 | | |
| 706 | Result | 0110 | 1011 | | |

| | | | | | |
| --- | --- | --- | --- | --- | --- |
| 707 | UE2 Mask 2b | | 0100 | 0001 | |
| 708 | Result | | 1100 | 0100 | |

| | | | | | |
| --- | --- | --- | --- | --- | --- |
| 709 | UE2 Mask 2c | | | 0111 | 0011 |
| 710 | Result | | | 0010 | 0010 |

Fig. 7

METHOD FOR ALLOCATING, BY A TELECOMMUNICATION DEVICE, AT LEAST A CHANNEL ELEMENT OF A GROUP OF CHANNEL ELEMENTS OF A CHANNEL RESOURCE TO A DESTINATION

BACKGROUND OF THE INVENTION

1. Field of the Invention

The present invention relates to a method and a device for allocating, by a telecommunication device, at least a channel element of a group of channel elements of a channel resource to a destination.

2. Description of Related Art

Correlatively, the present invention relates to a method and a device for determining if at least a channel element of a group of channel elements of a channel resource is allocated to a destination by a first telecommunication device.

In some classical wireless cellular telecommunication networks, a base station communicates with at least one mobile terminal, which is located within the coverage area of the base station. The base station allocates parts of the telecommunication network channel resource to the mobile terminal.

The channel resource is defined as the amount of frequency bandwidth, time, or spatial dimensions if the base station and the mobile terminals have several antennas. A part of the channel resource is named hereinafter a channel element. A channel element is a predefined subdivision of the channel resource.

Each channel element is composed of resource elements of the channel resource. As example, in case of single-antenna OFDM transmission, a resource element is a tone or sub-carrier of an OFDM symbol.

The base station needs to indicate to each mobile terminal, which channel element or elements is or are allocated to the mobile terminal. When plural channel elements are allocated to a mobile terminal, these channel elements are channel elements of a subset of the group of channel elements.

A channel element is either allocated for downlink and/or uplink transmission. A downlink transmission is a transmission from the base station to one or several mobile terminals. An uplink transmission is a transmission from one mobile terminal to the base station.

In order to indicate to each mobile terminal which channel element or elements is or are allocated to the mobile terminal, the base station uses a group of control channel elements which is composed of control channel elements.

A control channel element is composed of resource elements of the channel resource. As example, in case of single-antenna OFDM transmission, a resource element is a tone or sub-carrier of an OFDM symbol.

Each control channel element size allows the transmission of information representative of the channel coding, like convolution or turbo coding, and/or of the modulation scheme and/or of a location of a subset of the group of channel elements and/or of a space time code to be used by the destination for a subset of the group of channel elements.

On each control channel, element data are mapped. The data are information and a classical cyclic redundancy checksum (CRC) of the information, the information and the CRC being coded and modulated.

The CRC is a block code used to check if there remain errors after decoding.

The resource allocation maps other data to be transmitted to each mobile terminal on a subset composed of channel elements of the group of channel elements.

One or plural control channel elements are allocated to a given mobile terminal as example according to the distance separating the base station and the mobile terminal or according to the attenuation and/or interference which exist in the communication link between the base station and the mobile terminal or according to the amount of data to be transferred.

As example, a lower code rate may be used in order to improve the robustness of the transmission of the coded and modulated information combined with CRC intended to be mapped in a control channel element or the coded and modulated information combined with CRC are duplicated and mapped on at least one other control channel element, which is allocated to the mobile terminal. When plural control channels elements are allocated to a given mobile terminal, these control channel elements are consecutive or not.

In order to enable each mobile terminal to recover both its allocated subset of at least one channel element and data through the control channel elements, the base station indicates, in the data mapped in each control channel element, the identifier of the destination mobile terminal or masks the data formed by coded and modulated information combined with CRC with the identifier of the mobile terminal. The masked data are mapped in each control channel element.

Each mobile terminal has to recover both its allocated subset of at least one channel element and data through the control channel elements. More precisely, each mobile terminal has to know the number of control channel elements which have been allocated to it and which control channel element or elements have been allocated to it. When plural control channel elements are allocated to a mobile terminal, the control channel elements allocated to the mobile terminal are control channel elements of a subset of at least one control channel element of the group of control channel elements.

Each mobile terminal needs to apply a mask on each control channel element and to proceed to a demodulation, a decoding of the coded and modulated information combined with CRC and to perform a CRC check for each control channel element.

Such process needs high processing capabilities for the mobile terminals and increases the cost of the mobile terminals.

The European patent application number 07 008627 filed on 27 Apr. 2007, proposes to use, for each channel element allocated to one destination, different randomisation functions which are determined according to the position of the channel elements within the group of channel elements and according to the destination.

The data to be included in each channel element are processed by the randomisation function determined for the channel element and transferred to the mobile terminal.

That patent application proposes also a decoding metric computation step which is performed for each channel element and each subset of at least one channel element, wherein the decoding metric increases with the adequacy of the demodulated processed received data and the structure of the code used.

Depending on the channel characteristics, this method may be more efficient in decreasing the complexity and uses well known Viterbi processing. That method may sometime have problems in ordering a subset of at least one channel element and the channel elements contained in it. As example, when the same data are mapped on two channel elements, the code structure is present in the result of an accumulation of the two channel elements but also individually in each channel element of the subset of two channel elements. Each decoding metric has then a high value.

In presence of noise and multi-path channel, the decoding metric of one channel element may be higher than the decoding metric of the subset of two channel elements. Thus, the erroneous sorting from highest to lowest decoding metrics of channel elements and subsets of channel elements results in an increased complexity compared to correct sorting.

BRIEF SUMMARY OF THE INVENTION

The aim of the invention is therefore to propose a method and a device which make it possible to prioritize the channel element or subset of at least one channel element used for a destination with respect to channel elements or subsets included in this subset.

To that end, the present invention concerns a method for allocating, by a telecommunication device, at least a channel element of a group of channel elements of a channel resource to a destination, each channel element being a predefined subdivision of the channel resource, characterised in that the method comprises the steps executed by the telecommunication device of:

determining the number of channel elements to be allocated to the destination, selecting at least one randomisation function according to the number of channel elements to be allocated to the destination, processing the data to be included in the or each channel element to be allocated to the destination by the at least one selected randomisation function, transferring the data processed by the at least one selected randomisation function by mapping the data processed by the at least one randomisation function on the at least one channel element.

The present invention concerns also a device for allocating at least a channel element of a group of channel elements of a channel resource to a destination, each channel element being a predefined subdivision of the channel resource, characterised in that the device comprises:

means for determining the number of channel elements to be allocated to the destination, means for selecting at least one randomisation function according to the number of channel elements to be allocated to the destination, means for processing the data to be included in the or each channel element to be allocated to the destination by the at least one selected randomisation function, means for transferring the data processed by the at least one selected randomisation function by mapping the data processed by the at least one randomisation function on the at least one channel element.

Thus, it is possible to avoid that the destination determines an erroneous number of channel elements allocated to it. The complexity of the determination by the destination of the allocated channel element or elements is reduced.

According to a particular feature, the randomisation functions are scrambling sequences and the processes of the data are multiplications or the randomisation functions are interleaving functions and the processes of the data are permutations.

Thus, the complexity of the processing by the telecommunication device and the determination by the destination of the allocated channel element or elements is reduced.

According to a particular feature, plural channel elements are allocated to the destination, one randomisation function is selected and the data to be included in each channel element to be allocated to the destination are processed by the selected randomisation function.

Thus, the complexity of the processing by the telecommunication device and the determination by the destination of the allocated channel element or elements is reduced, only a limited number of randomization functions is required.

According to a particular feature, the method is executed for plural destinations, one randomisation function is selected for each destination and each randomisation function is further selected according to the destination.

Thus, the complexity of the processing by the telecommunication device and the determination by each destination of the channel element or elements, which is or are allocated to it, is reduced.

According to a particular feature, one channel element is allocated to the destination, one randomisation function is selected and the selected randomisation function is further selected according to the position of the allocated channel element within the group of channel elements.

Thus, the code structure of the data is broken efficiently.

According to a particular feature, plural channel elements are allocated to the destination, for each channel element allocated to the destination, one randomisation function is selected, each selected randomisation function is further selected according to the position of the channel element for which the randomisation function is selected within the group of channel elements.

Thus, the code structure of the data is broken efficiently and the complexity of the determination by the destination of the channel element or elements, which is or are allocated to it, is reduced.

According to a particular feature, plural channel elements of a subset of channel elements are allocated to the destination, for each channel element allocated to the destination, one randomisation function is selected and each selected randomisation function is further selected according to the position of the channel element within the subset of channel elements.

Thus, the determination of the randomisation functions is executed based on a simple criterion.

According to a particular feature, plural channel elements of a subset of channel elements are allocated to the destination, for each channel element allocated to the destination, one randomisation function is selected and each selected randomisation function is further selected according to the position of the channel element within the subset of channel elements and according to the position of each channel element allocated to the destination within the group of channel elements.

Thus, the determination of the randomisation functions is executed based on a simple criterion.

According to a particular feature, the data are formed by modulating and coding information combined with a cyclic redundancy of the information.

According to a particular feature, the destination is another telecommunication device or an application executed by the other telecommunication device.

Thus, it is possible, for the other telecommunication device to identify for which application or applications the channel element or elements is or are allocated. Different applications embedded in the other telecommunication device can be distinguished.

According to a particular feature, the channel elements are control channel elements and the data are representative of a modulation and/or a coding scheme to be used by the destination for a subset of the group of channel elements and/or a location of a subset of the group of channel elements and/or a space time code to be used by the destination for a subset of the group of channel elements.

Thus, the present invention is particularly efficient in a system, in which the allocation of channel elements is centralized at the level of the telecommunication device.

According to a particular feature, the channel elements allocated to one destination are consecutive channel elements in the group of channel elements.

Thus, the determination by the destination of the channel element or channel elements, which is or are allocated to it, is reduced because the number of subsets is reduced.

The present invention concerns also a method for determining if at least a channel element of a group of channel elements of a channel resource is allocated to a destination by a first telecommunication device, each channel element being a predefined subdivision of the channel resource, characterised in that the method comprises the steps executed by the destination of:

receiving a group of channel elements on which received data are mapped, selecting at least one randomisation function according to a number of channel elements susceptible to be allocated to the destination, processing the received data mapped on at least one channel element by the at least one selected randomisation function, determining, from the processed received data, if at least one channel element is allocated to the destination.

The present invention concerns also a device for determining if at least a channel element of a group of channel elements of a channel resource are allocated to a destination by a first telecommunication device, each channel element being a predefined subdivision of the channel resource, characterised in that the device for determining if at least one channel element of a group of channel elements of the channel resource is allocated to the destination comprises:

means for receiving a group of channel elements on which received data are mapped, means for selecting at least one randomisation function according to a number of channel elements susceptible to be allocated to the destination, means for processing the received data mapped on at least one channel element by the at least one selected randomisation function, means for determining, from the processed received data, if at least one channel element is allocated to the destination.

Thus, it is possible to avoid that the destination determines an erroneous number of channel elements allocated to it. The complexity of the determination by the destination of the allocated channel element or elements is reduced.

According to a particular feature, the destination:

selects at least one other randomisation function according to another number of channel elements susceptible to be allocated to the destination, processes the received data mapped on at least one channel element by the at least one other selected randomisation function, and the determination if at least one channel element is allocated to the destination is executed from the received data processed by the selected randomisation function and processed by the other selected randomisation function.

Thus, it is possible to process different sizes of subsets of channel elements.

According to a particular feature, the at least one randomisation function is one randomisation function selected according to the number of channel elements, susceptible to be allocated to the destination and each received data mapped on one channel element of the group of channel elements is processed by the randomisation function.

Thus, the complexity of the determination by the destination of the allocated channel element or elements is reduced, only a limited number of randomization functions is required.

According to a particular feature, the at least one other randomisation function is one other randomisation function selected according to the other number of channel elements susceptible to be allocated to the destination and each received data mapped on one channel element of the group of channel elements is processed by the other randomisation function.

Thus, the complexity of the determination by the destination of the allocated channel element or elements is reduced, only a limited number of randomization functions is required.

According to a particular feature, the destination:

determines a first metric from the processed received data mapped on the at least one channel element by the at least one other selected randomisation function, determines a second metric from the processed received data mapped on the at least one channel element by the at least one other selected randomisation function, and the determination if the channel elements of one subset of at least one channel element are allocated to the destination is executed using the determined metrics.

Thus, the determination by the destination of the allocated channel element or elements is simple to execute.

According to a particular feature, a subset of at least one randomisation function comprising one randomisation function for each channel element of the group of channel elements is selected according to the number of channel elements susceptible to be allocated to the destination and each received data mapped on one channel element of the group of channel elements is processed by the randomisation function for the channel element.

Thus, the determination by the destination of the allocated channel elements is simple to execute.

According to a particular feature, another subset of at least one randomisation function comprising one randomisation function for each channel element of the group of channel elements is selected according to the other number of channel elements susceptible to be allocated to the destination and each received data mapped on one channel element of the group of channel elements is processed by the randomisation function for the channel element.

Thus, the code structure of the data is broken efficiently and the complexity of the determination by the destination of the channel element or elements, which is or are allocated to it, is reduced.

According to a particular feature, the destination:

determines a first metric from the processed received data mapped on the at least one channel element by the selected subset of at least one randomisation function, determines a second metric from the processed received data mapped on the at least one channel element by the other selected subset of at least one randomisation function, and the determination if the channel elements of one subset of at least one channel element are allocated to the destination is executed using the determined metrics.

Thus, the determination by the destination of the allocated channel element or elements is simple to execute.

According to a particular feature, plural channel elements are allocated to the destination and the destination selects a first subset of at least one channel element of the group of channel elements and one randomisation function is selected for each channel element of the first subset of channel elements, each selected randomisation function is further selected according to the position of the channel element within the first subset of channel elements and each received data mapped on one channel element of the first subset is processed by the randomisation function corresponding to the position of the channel element within the first subset of at least one channel element.

Thus, the determination of the randomisation functions is executed based on a simple criterion.

According to a particular feature, the destination selects a second subset of at least one channel element of the group of channel elements, the second subset of at least one channel element comprises the same number of channel elements as the first subset and each received data mapped on one channel element of the second subset is processed by the randomisation function corresponding to the position of the channel element within the second subset of at least one channel element.

Thus, the determination of the randomisation functions is executed based on a simple criterion.

According to a particular feature, the destination selects a third subset of at least one channel element of the group of channel elements, the third subset of at least one channel element comprises a different number of channel elements as the first subset, the destination selects one second randomisation function for each channel element of the third subset of at least one channel element, each second selected randomisation function is further selected according to the position of the channel element within the third subset of at least one channel element and each received data mapped on one channel element of the third subset is processed by the second randomisation function corresponding to the position of the channel element within the third subset of at least one channel element.

Thus, the determination of the randomisation functions is executed based on a simple criterion.

According to a particular feature, the destination:
determines a first metric from the processed received data mapped on channel elements of the first subset,
determines a second metric from the processed received data mapped on channel elements of the second subset,
determines a third metric from the processed received data mapped on channel elements of the third subset,
and the determination if the channel elements of one subset of at least one channel element are allocated to the destination is executed using the determined metrics.

Thus, the determination by the destination of the allocated channel element or elements is simple to execute.

According to a particular feature, plural channel elements are allocated to the destination, the destination selects a first subset of at least one channel element of the group of channel elements and selects one randomisation function for each channel element of the first subset of at least one channel element, each selected randomisation function is further selected according to the position of the channel element within the first subset of at least one channel element and according to the position of each channel element within the group of channel elements and each received data mapped on one channel element of the first subset is processed by the selected randomisation function corresponding to the position of the channel element within the first subset of at least one channel element and the position of each channel element within the group of channel elements.

Thus, the determination of the randomisation functions is executed based on a simple criterion.

According to a particular feature, the destination selects a second subset of at least one channel element of the group of channel elements, the second subset of at least one channel element has the same number of channel elements of the first subset of at least one channel element and one second randomisation function is selected for each channel element of the second subset of at least one channel element, each second selected randomisation function is further selected according to the position of the channel element within the second subset of at least one channel element and according to the position of each channel element within the group of channel elements and each received data mapped on one channel element of the second subset is processed by the second selected randomisation function corresponding to the position of the channel element within the second subset of at least one channel element and according to the position of each channel element within the group of channel elements.

Thus, the determination of the randomisation functions is executed based on a simple criterion.

According to a particular feature, the destination selects a third subset of at least one channel element of the group of channel elements, the third subset of at least one channel element has a different number of channel elements of the first subset of at least one channel element and one third randomisation function is selected for each channel element of the third subset of at least one channel element, each third selected randomisation function is further selected according to the position of the channel element within the third subset of at least one channel element and according to the position of each channel element within the group of channel elements and each received data mapped on one channel element of the third subset is processed by the third selected randomisation function corresponding to the position of the channel element within the third subset of at least one channel element and according to the position of each channel element within the group of channel elements.

Thus, the determination of the randomisation functions is executed based on a simple criterion.

According to a particular feature, the destination:
determines a first metric from the processed received data mapped on channel elements of the first subset,
determines a second metric from the processed received data mapped on channel elements of the second subset,
determines a third metric from the processed received data mapped on channel elements of the third subset,
and the determination if the channel elements of one subset of at least one channel element are allocated to the destination is executed using the determined metrics.

Thus, the determination by the destination of the allocated channel element or elements is simple to execute.

According to still another aspect, the present invention concerns computer programs which can be directly loadable into a programmable device, comprising instructions or portions of code for implementing the steps of the methods according to the invention, when said computer programs are executed on a programmable device.

Since the features and advantages related to the computer programs are the same as those set out above related to the method and device according to the invention, they will not be repeated here.

According to still another aspect, the present invention concerns a signal transferred by a telecommunication device to a destination, the signal being representative of an allocation to the destination of at least a channel element of a group of channel elements of a channel resource, each channel element being a predefined subdivision of the channel resource, the signal comprises data mapped on at least one channel element, data being processed by at least one randomisation function, characterised in that the at least one randomisation function is representative of the number of channel elements to be allocated to the destination.

Since the features and advantages related to the signal are the same as those set out above related to the method and device according to the invention, they will not be repeated here.

The characteristics of the invention will emerge more clearly from a reading of the following description of an example of embodiment, the said description being produced with reference to the accompanying drawings, among which:

BRIEF DESCRIPTION OF THE SEVERAL VIEWS OF THE DRAWINGS

FIG. 4 depicts the different operations executed by a first telecommunication device and a second telecommunication device on control channel elements according to a first mode of realisation of the present invention;

FIG. 5 depicts the different operations executed by a first telecommunication device and a second telecommunication device on control channel elements according to a second mode of realisation of the present invention;

FIG. 6 depicts the different operations executed by a first telecommunication device and a second telecommunication device on control channel elements according to a third mode of realisation of the present invention;

FIG. 7 depicts the different operations executed by a first telecommunication device and a second telecommunication device on control channel elements according to a fourth mode of realisation of the present invention;

DETAILED DESCRIPTION OF THE INVENTION

Figure 1:
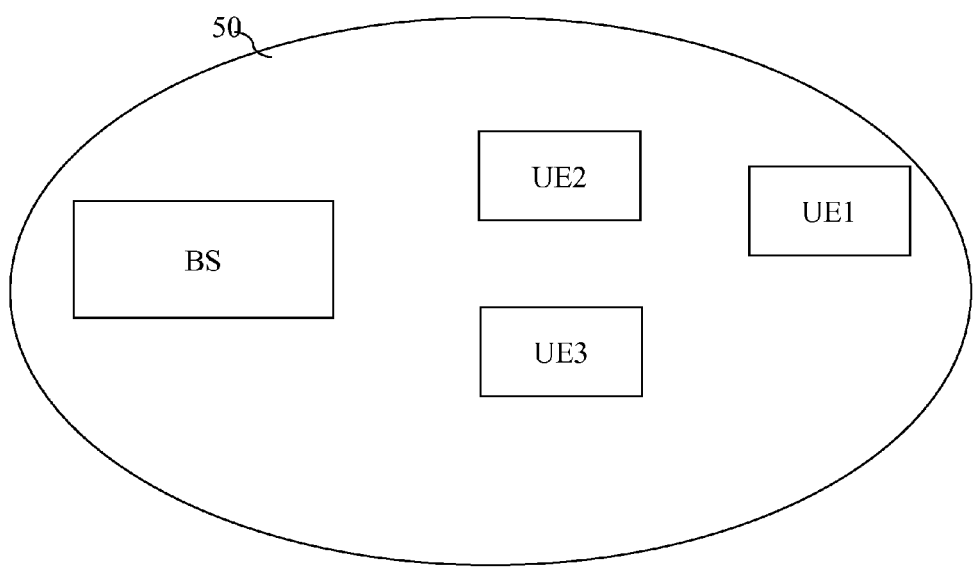
FIG. 1 is a diagram representing the architecture of a telecommunication network according to the present invention.

FIG. 1 is a diagram representing the architecture of a telecommunication network according to the present invention.

The present invention will be described in a wireless network like a wireless cellular network or a local area network but the present invention is also applicable to wired networks like power line networks.

Only one coverage area 50 of a first telecommunication device BS is shown in the FIG. 1 for the sake of simplicity but in practice, and especially when the wireless network is a wireless cellular network, the wireless cellular telecommunication network is composed of a more important number of first telecommunication devices BS and coverage areas 50.

In the telecommunication network of the FIG. 1, at least one and preferably plural second telecommunication devices UE1, UE2 and UE3 are comprised in a coverage area 50 of the first telecommunication device BS.

Only three second telecommunication devices UE are shown in the FIG. 1 for the sake of simplicity but in practice, a more important number of second telecommunication devices UE are in the coverage area 50 of the first telecommunication device BS.

The first telecommunication device BS is a base station or a node B or a node or an enhanced node B or an access point.

The second telecommunication devices UE are as example mobile phones, personal digital assistants or personal computers or computer peripheral devices.

According to the example of the FIG. 1, the first telecommunication device BS intends to communicate with at least one second telecommunication device UE. For that, the first telecommunication device BS allocates parts of the telecommunication network channel resource to the at least one second telecommunication device UE.

As disclosed in the prior art, the first telecommunication device BS needs to indicate to each second telecommunication device UE which channel element or elements is or are allocated to the second telecommunication device UE for downlink and/or uplink transmission.

For that, the first telecommunication device BS uses the group of control channel elements which is composed of control channel elements.

One or plural control channel elements are allocated to a given second telecommunication device UE, as example according to the distance separating the first telecommunication device BS and the second telecommunication device UE or according to the attenuation and/or interference which exist in the communication link between the first telecommunication device BS and the second telecommunication device UE or according to the amount of data to be transferred.

When plural control channel elements are allocated to a given second telecommunication device UE, these control channel elements are consecutive or not.

The channel element or elements or control channel element or elements allocated to a second telecommunication device UE is or are channel element or elements or control channel element or elements of a subset of the group of channel elements or of the group of control channel elements.

The channel elements or the control channel elements have a position within a subset of the group of channel elements or of the group of control channel elements.

The channel elements or the control channel elements have a position within the group of channel elements or the group of control channel elements.

The first and second telecommunication devices determine the position of the channel elements or the control channel elements using the same rule.

According to the invention, in order to enable each second telecommunication device UE to recover both its allocated channel element or elements and data through the group of control channel elements, the first telecommunication device BS processes the data formed by coded and modulated information combined with a CRC of the information and maps the processed data on a control channel element, the data are processed by a randomisation function determined according to the number of channel elements to be allocated to the destination.

The randomisation functions are scrambling sequences or interleaving functions aiming at breaking the repetition structure of the data.

When a randomisation function is a scrambling sequence, the process of data is a multiplication of the data by the scrambling sequence.

When a randomisation function is an interleaving function, the process of data is a permutation of the data by the interleaving function.

Any other technique, breaking the code structure of the data, can be used in the present invention.

The destination, to which channel element or elements or control channel element or elements is or are allocated, is a second telecommunication device UE or more precisely an application executed on a second telecommunication device UE. An application is either an application which manages the reception of data through the downlink channel or an application which manages the transfer of data through the uplink channel or any other application like the reception and/or the transfer of particular data like data related to video application or voice application.

When the application is an application which manages the reception of data through the downlink channel, the allocated control channel element or elements grants or grant the reception of data through the downlink channel by the second telecommunication device UE which executes the application which manages the reception of data through the downlink channel.

When the application is an application which manages the reception of data through the downlink channel, the allocated channel element or elements grants or grant the reception of data through the downlink channel on the allocated channel element or elements by the second telecommunication device UE which executes the application which manages the reception of data through the downlink channel.

When the application is an application which manages the transfer of data through the uplink channel, the allocated control channel element or elements grants or grant the transfer of data through the uplink channel by the second telecommunication device UE which executes the application which manages the transfer of data through the uplink channel.

When the application is an application which manages the transfer of data through the uplink channel, the allocated channel element or elements grants or grant the transfer of data through the uplink channel on the allocated channel element or elements by the second telecommunication device UE which executes the application which manages the transfer of data through the uplink channel.

When the randomisation functions are scrambling sequences, the scrambling sequences can be derived from at least a part of at least one identifier of the second telecommunication device UE to which the control channel element is allocated. The part of the identifier is determined among plural parts of at least one identifier of the second telecommunication device UE according at least to the number of channel elements to be allocated to the destination.

When the randomisation functions are interleaving functions, the interleaving functions can be derived from at least one identifier of the second telecommunication device UE to which the control channel element is allocated. Each of the interleaving functions is different from the other interleaving functions.

An identifier of a second telecommunication device UE is an information which uniquely identifies the second telecommunication device UE among the other second telecommunication devices UE comprised in the coverage area 50 of the first telecommunication device BS or is an information which uniquely identifies the second telecommunication device UE among the other second telecommunication devices UE comprised in at least a part of the telecommunication network.

A second telecommunication device UE may have more than one identifier. As example, an identifier may be used for indicating to a second telecommunication device UE which channel element or elements is or are allocated to the second telecommunication device UE for downlink transmission and another identifier may be used for indicating to the second telecommunication device UE which channel element or elements is or are allocated to the second telecommunication device UE for uplink transmission.

According to another example, different identifiers are used for indicating to different applications executed on the second telecommunication device UE which channel element or elements is or are allocated respectively to the applications.

It has to be noted here that each scrambling sequence can be determined from classical code allocation method and especially from code allocation methods which warrant the maximal distance between codes.

As example, if a (2T, NUEID+NCEindex, Dhmin) linear code is used, i.e. with an input length NUEID+NCEindex and output length of 2T, where T is the number of modulation symbols for a control channel element or in other words, is the number of resource elements per control channel element. The minimum Hamming distance of the code is Dhmin. The 2T bits can be used directly in case of a QPSK modulation using a Boolean exclusive OR mask, or the 2T bits can be used for forming T complex symbols in case of any modulation. The T complex symbols are under the form of $(2c_{2i}-1)+j(2c_{2i+1}-1)$, where $c_x$ is the value of the bit at the position x. $2^{NUEID}$ is the total number of identifiers of the second telecommunication devices UE and $2^{NCEindex}$ is the number of scrambling sequences per identifier.

According to the first mode of realisation of the present invention, the NCEindex bits allow to change the scrambling sequence of a given destination from a size of a subset of at least one control channel element to another size of a subset of at least one control channel element. NCEindex is equal to the closest integer higher or equal to $\log_2(NAgg)$, where NAgg is the number of possible sizes of subsets of at least one control channel element which can be allocated to a destination.

According to the second mode of realisation of the present invention, the NCEindex bits allow to change the scrambling sequence of a given destination from a size of a subset of at least one control channel element to another size of a subset of at least one control channel element and from a control channel element to another control channel element.

NCEindex is equal to the closest integer higher or equal to $\log_2(NAgg*oN)$, where N is the number of control channel elements of the group of control channel elements.

According to the third mode of realisation of the present invention, the NCEindex bits allow to change the scrambling sequence of a given destination from a size of a subset of at least one control channel element to another size of a subset of at least one control channel element and from a control channel element to another control channel element. NCEindex is equal to the closest integer higher or equal to $$\log_2\left(\sum_{j=1}^{Nagg} Agg(j)\right),$$

where $Agg(1), Agg(2), \ldots, Agg(Nagg)$ are the Nagg possible numbers of control channel elements in a subset of at least one control channel element which can be allocated to a destination.

According to the fourth mode of realisation of the present invention, the NCEindex bits allow to change the scrambling sequence of a given destination from a size of a subset of at least one control channel element to another size of a subset of at least one control channel element and from a subset of at least one control channel element to another subset of at least one control channel element. NCEindex is equal to the closest integer higher or equal to $$\log_2\left(\sum_{subsets} N_{subset}(i)\right),$$

where $N_{subset}(i)$ is the number of control channel elements in a subset i of at least one control channel element.

If two destinations, like two second telecommunication devices UE, have distinct identifiers and the same value of the coded information combined with CRC, their scrambling sequences are separated by at least a Hamming distance of Dhmin bits.

If the linear code is convolutional or cyclic, the first telecommunication device BS does not need to generate all the scrambling sequences of all the second telecommunication devices UE. The first telecommunication device BS generates the scrambling sequences according to the instantaneous resource allocation scheme, by correctly setting the NCEindex plus NUEID bits at the input of the linear code in order to obtain 2T bits for scrambling at the output of the code one control channel element. That process is reiterated for the following control channel elements. Each second telecommunication device UE can either store its own scrambling sequences or generated them on the fly.

As example, if NUEID is equal to 16, NCEindex is equal to 6 and T is equal to 35, the code needs to have a rate of 22 over 70.

A convolutional code having a constraint length of 14 for 22 input bits provides (22+13)*2=70 output bits and Dhmin is equal to 16.

A convolutional code having a constraint length of 3 for 22 input bits provides (22+2)*3=72 output bits and Dhmin is equal to 8.

In another example, an algebraic geometric code, otherwise known as a Goppa code which is a specific block code, with a rate of 19 over 69 provides a Hamming distance of 21 bits.

Each second telecommunication device UE has to recover both its allocated subset of at least one channel element and data through the control channel elements. More precisely, each second telecommunication device UE has to know the number of control channel elements which has been allocated to it and which control channel element or elements have been allocated to it.

Figures 8, 9:
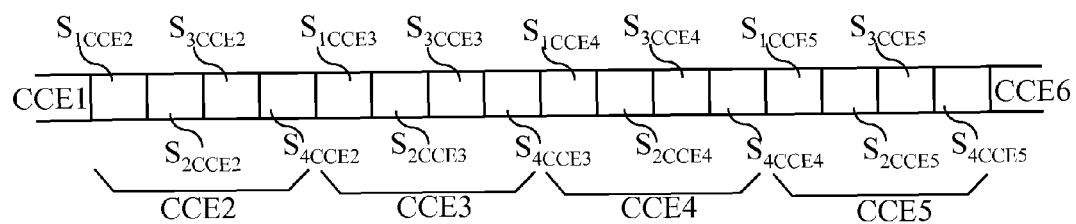
FIG. 8 depicts channel elements and subsets of the group of control channel elements in an example wherein the group of control channel elements comprises six control channel elements.
FIG. 9 depicts an example of symbols comprised in each control channel element of the group of control channel elements in an example wherein the control channel comprises six control channel elements.

FIG. 8 depicts subsets of the group of control channel elements in an example wherein the group of control channel elements comprises six control channel elements.

The columns 800 to 805 comprise different possible subsets of one control channel element which are susceptible to be allocated to a second telecommunication device UE.

The columns 806 to 810 comprise different possible subsets composed of two control channel elements.

The column 806 comprises a subset composed of the control channel elements CCE1 and CCE2 marked by a cross in the column 806.

The column 807 comprises another subset composed of the control channel elements CCE2 and CCE3 marked by a cross in the column 807, the column 808 comprises another subset composed of the control channel elements CCE3 and CCE4 marked by a cross in the column 808 and so on up to the column 810.

The columns 811 to 814 comprise different possible subsets composed of three control channel elements. The columns 815 to 817 comprise different possible subsets composed of four control channel elements. The columns 818 and 819 comprise different possible subsets composed of five control channel elements and the column 820 comprises a subset composed of six control channel elements.

The control channel element CCE1 has the first position in the group of control channel elements, the control channel element CCE2 has the second position in the group of control channel elements, the control channel element CCE3 has the third position in the group of control channel elements, the control channel element CCE4 has the fourth position in the group of control channel elements, the control channel element CCE5 has the fifth position in the group of control channel elements and the control channel element CCE6 has the sixth position in the group of control channel elements.

The control channel element CCE2 has the first position in the subset marked by crosses in the column 807 and the control channel element CCE3 has the second position in the subset marked by crosses in the column 807.

Figure 2:
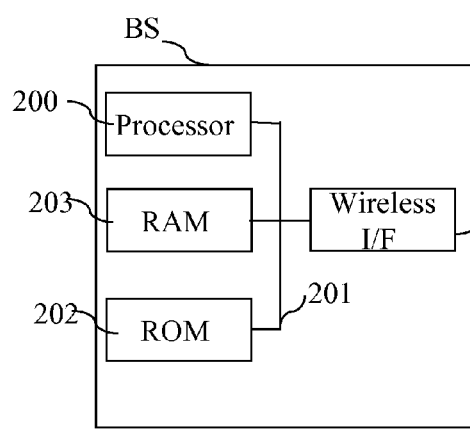
FIG. 2 is a block diagram of a first telecommunication device according to the present invention.

FIG. 2 is a block diagram of a first telecommunication device according to the present invention.

Figure 10:
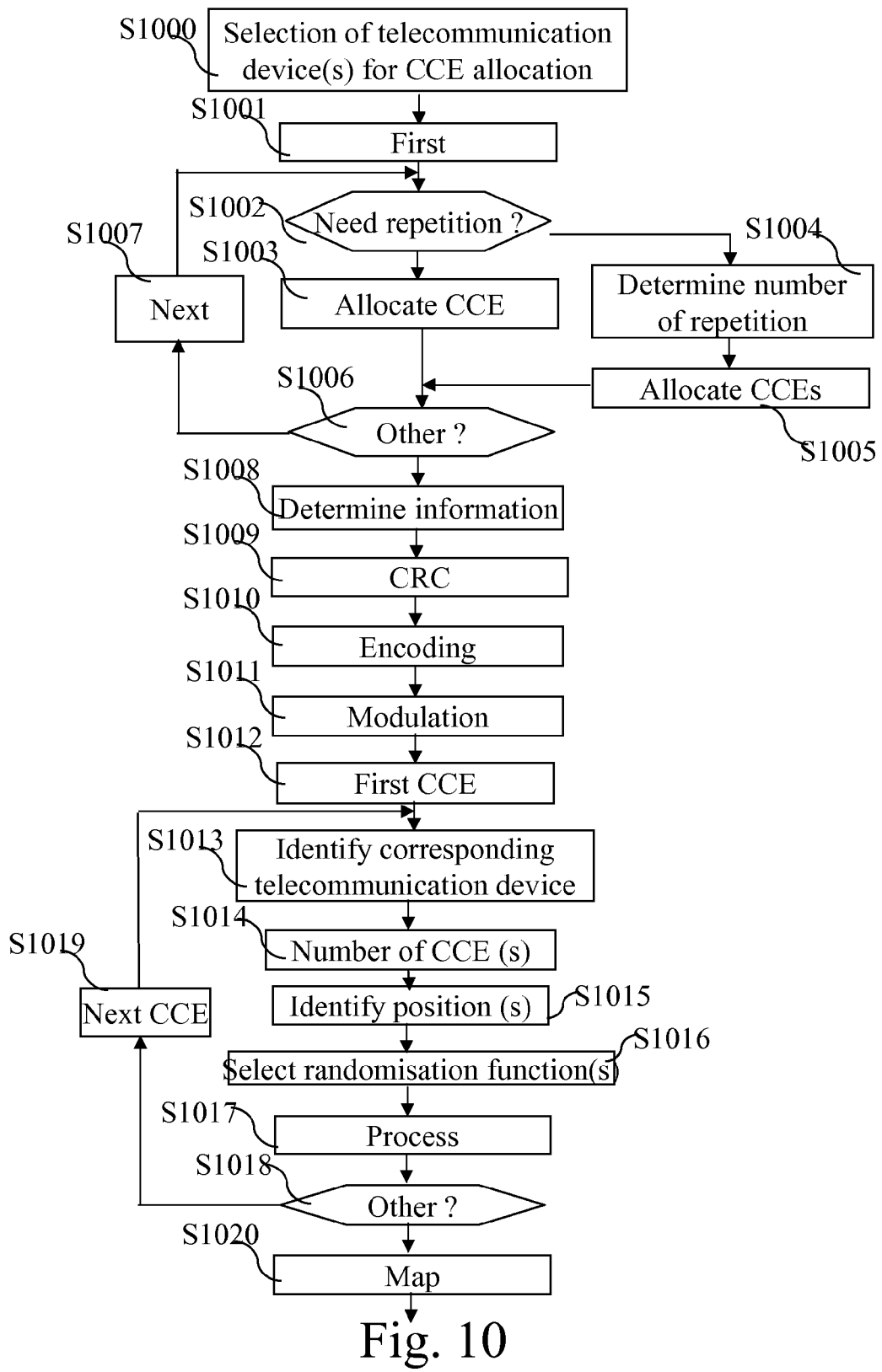
FIG. 10 depicts an algorithm executed by the first telecommunication device according to the present invention.

The first telecommunication device BS has, for example, an architecture based on components connected together by a bus 201 and a processor 200 controlled by the program related to the algorithm as disclosed in the FIG. 10.

It has to be noted here that the first telecommunication device BS is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 10 which are transferred, when the first telecommunication device BS is powered on to the random access memory RAM 203.

The RAM memory 203 contains registers intended to receive variables, and the instructions of the programs related to the algorithm, as disclosed in the FIG. 10.

The processor 200 is able to determine a randomisation function at least according to the number of channel elements to be allocated to the destination and when plural second telecommunication devices UE are comprised in the coverage area 50, according to the destination to which the control channel element is allocated as it has been disclosed in reference to the FIGS. 4 to 7.

The wireless interface 206 comprises encoding means and modulation means.

The wireless interface 206 comprises also decoding means and de-modulation means.

Figure 3:
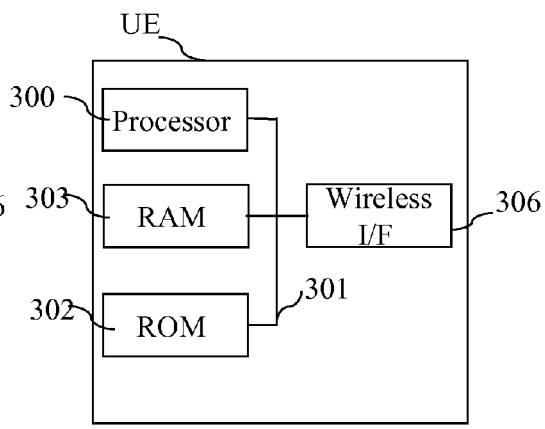
FIG. 3 is a block diagram of a second telecommunication device according to the present invention.

FIG. 3 is a block diagram of a second telecommunication device according to the present invention.

Figure 11:
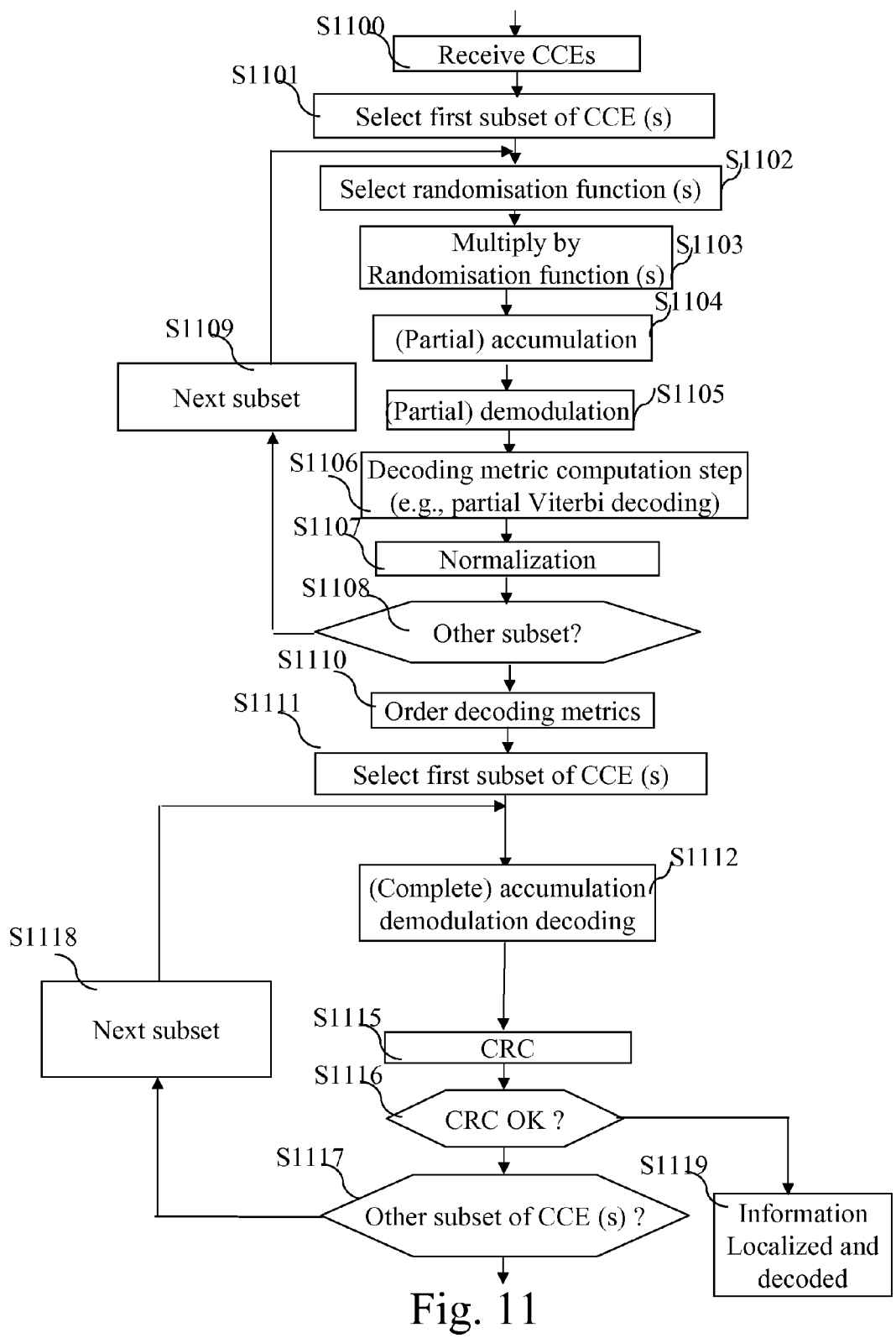
FIG. 11 depicts an algorithm executed by each second telecommunication device according to the present invention.
Figure 12:
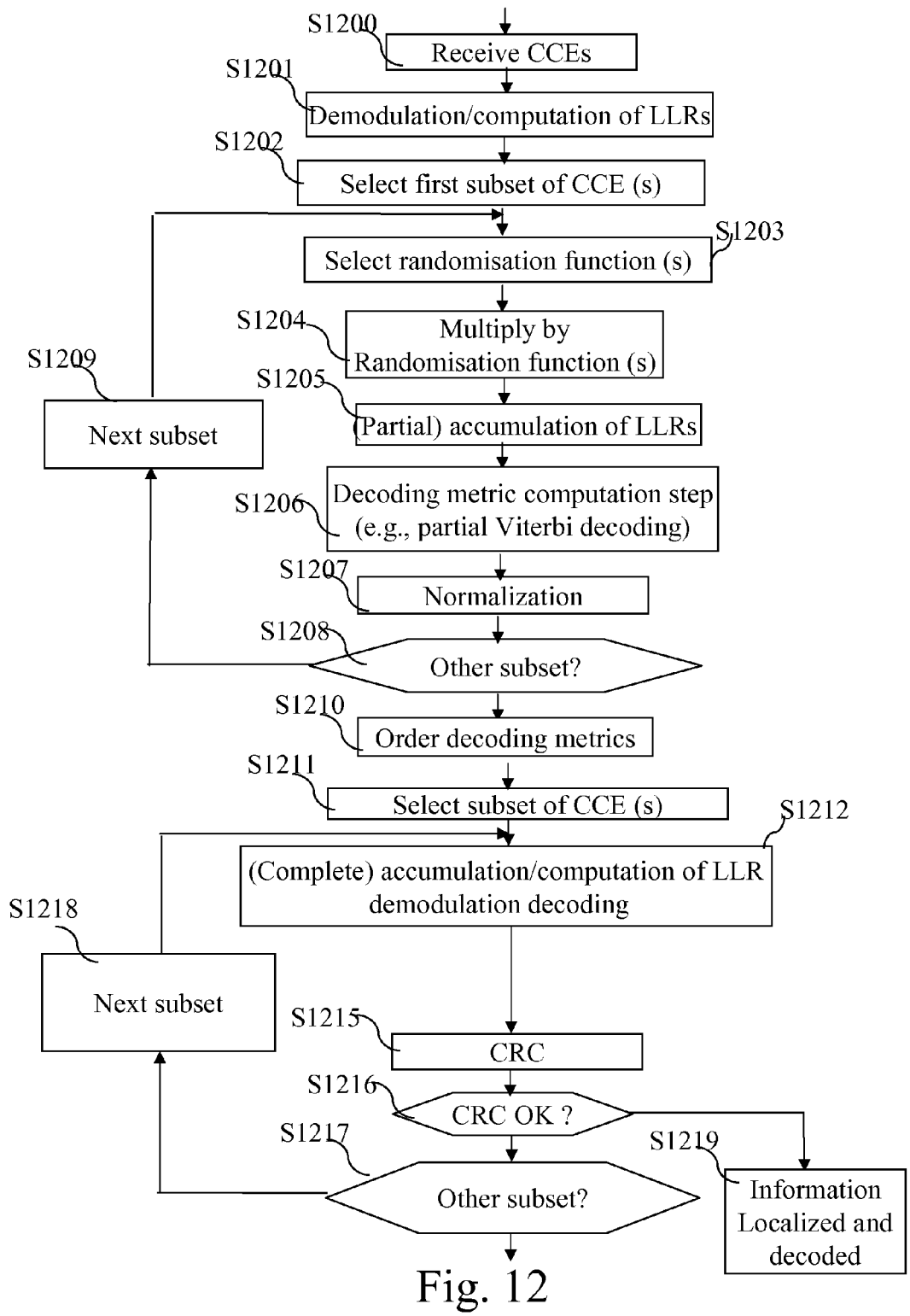
FIG. 12 depicts an algorithm executed by each second telecommunication device according to a variant of the present invention.

Each second telecommunication device UE has, for example, an architecture based on components connected together by a bus 301 and a processor 300 controlled by the program related to the algorithms as disclosed in the FIG. 11 or 12.

It has to be noted here that the second telecommunication devices UE are, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the programs related to the algorithms as disclosed in the FIG. 11 or 12 which are transferred, when the second telecommunication device UE is powered on to the random access memory RAM 303.

The RAM memory 303 contains registers intended to receive variables, and the instructions of the programs related to the algorithms as disclosed in the FIG. 11 or 12.

The processor 300 is able to determine, for each control channel element, a randomisation function according to a number of channel elements susceptible to be allocated to the second telecommunication device UE as it has been disclosed in reference to the FIGS. 4 to 7.

The wireless interface 306 comprises encoding means and modulation means.

The wireless interface 306 comprises also decoding means and de-modulation means.

FIG. 4 depicts the different operations executed by a first telecommunication device and a second telecommunication device on control channel elements according to a first mode of realisation of the present invention.

According to the first mode of realisation, one randomisation function is associated to each possible number of control channel elements allocated or susceptible to be allocated by the first telecommunication device BS to a second telecommunication device UE.

The randomisation function associated to one number of control channel elements is different from each randomisation function associated to the other numbers of control channel elements.

When plural second telecommunication devices UE are comprised in a coverage area 50 of the first telecommunication device BS, one randomisation function is associated to each possible number of control channel elements allocated or susceptible to be allocated by the first telecommunication device BS to one second telecommunication device UE and to each second telecommunication device UE.

Each randomisation function associated to each second telecommunication device UE is different from each randomisation function associated to other second telecommunication devices UE.

The FIG. 4 discloses the different operations executed when the randomisation functions are scrambling sequences in an example where one control channel element or two control channel elements can be allocated to each second telecommunication device UE.

In the example of the FIG. 4, two control channel elements are allocated to each second telecommunication device UE1 and UE2.

The operations, shown in lines 400 to 402, are executed by the first telecommunication device BS and the operations shown in lines 403 to 406 by the second telecommunication device UE2.

The line 400 shows data formed by coded and modulated information combined with CRC.

The line 401 shows examples scrambling sequences used as masks. It has to be noted here that different scrambling sequences are allocated to a given second telecommunication device UE. Each scrambling sequence is determined for one second telecommunication device UE, according to the number of control channel elements allocated to the second telecommunication device UE.

When plural second telecommunication devices UE are comprised in coverage area 50, each scrambling sequence is further determined according to the second telecommunication device UE, to which the scrambling sequence is allocated.

The line 402 shows the result of the scrambling by the first telecommunication device BS of the data formed by the coded and modulated information combined with CRC by scrambling sequences determined as disclosed previously, as example a Boolean exclusive OR. The scrambled data are mapped on the control channel elements.

The lines 403 and 405 show the de-scrambling sequences determined by the second telecommunication device UE2 for de-scrambling or masking the data formed by the coded and modulated information combined with CRC according to an expected number of control channel elements allocated to the second telecommunication device UE2.

The lines 404 and 406 show the result of the de-scrambling, by the second telecommunication device UE2, of the coded and modulated information combined with CRC by the de-scrambling sequences respectively shown in lines 403 and 405.

The intersections of the lines 400 to 402 and the column 407 show the operation executed by the first telecommunication device BS for a first control channel element allocated to the second telecommunication device UE1 and the intersections of the lines 400 to 402 and the column 408 show the operation executed by the first telecommunication device BS for a second control channel element allocated to the second telecommunication device UE1.

The intersections of the lines 400 to 402 and the column 409 show the operation executed by the first telecommunication device BS for a third control channel element allocated to the second telecommunication device UE2 and the intersections of the lines 400 to 402 and the column 410 show the operation executed by the first telecommunication device BS for a fourth control channel element allocated to the second telecommunication device UE2.

It has to be noted here that, according to the example of the FIG. 4, the control channel elements are consecutive but the control channel elements are not necessary consecutive in the present invention.

According to the first mode of realisation of the present invention, the scrambling sequence selected according to the number of control channel elements to be allocated to one destination is used to multiply the data to be included in each control channel element to be allocated to the destination.

The scrambling sequence "001" shown in the intersections of columns 407, 408 and line 401 is the scrambling sequence which corresponds to two control channel elements allocated to the second telecommunication device UE1.

The scrambling sequence "011" shown in the intersections of columns 409, 410 and line 401 is the scrambling sequence which corresponds to two control channel elements allocated to the second telecommunication device UE2.

According to the example of the FIG. 4, the first telecommunication device BS intends to map in the first control channel element allocated to the second telecommunication device UE1 the coded and modulated information combined with CRC '001', masks it by the scrambling sequence '001' and obtains the value '000' which is mapped on the first control channel element allocated to the second telecommunication device UE1.

The first telecommunication device BS intends to map on the second control channel element allocated to the second telecommunication device UE1 the duplicated coded and modulated information combined with CRC '001', masks it by the scrambling sequence '001' and obtains the value '000' which is mapped on the second control channel element allocated to the second telecommunication device UE1.

The first telecommunication device BS intends to map on the third control channel element allocated to the second telecommunication device UE2 the coded and modulated information combined with CRC '010', masks it by the scrambling sequence '011' and obtains the value '001' which is mapped on the third control channel element allocated to the second telecommunication device UE2.

The first telecommunication device BS intends to map on the fourth control channel element allocated to the second telecommunication device UE2 the duplicated coded and modulated information combined with CRC '010', masks it by the scrambling sequence '011' and obtains the value '001' which is mapped on the fourth control channel element allocated to the second telecommunication device UE2.

Each second telecommunication device UE receives all the data mapped on the control channel elements.

Each second telecommunication device UE multiplies the received data mapped on each control channel element which is susceptible to be allocated to it by the scrambling sequence which corresponds to one allocated control channel element.

The scrambling sequence "110", shown in line 403, is the scrambling sequence which corresponds to a single control channel element which is expected to be allocated to the second telecommunication device UE2.

The line 404 shows the result of the masking executed by the second telecommunication device UE2 of the respective received data mapped on each received control channel element.

As it is shown in the line 404, none of the results "110", or "111" correspond to the data formed by coded and modulated information combined with CRC shown in the line 400. The decoding metric, obtained for each control channel element, will have then a low value.

Each second telecommunication device UE multiplies the received data mapped on each possible subset of at least one control channel element which is susceptible to be allocated to it by the scrambling sequence which corresponds to number of control channel elements comprised in the subset of at least one control channel element.

The scrambling sequence "011", shown in line 405, is the scrambling sequence which corresponds to a subset of two control channel elements which is expected to be allocated to the second telecommunication device UE2.

The line 406 shows the result of the masking executed by the second telecommunication device UE2 of the respective received data mapped on each received control channel element.

As it is shown in the line 406, the result "011" does not correspond to the data formed by coded and modulated information combined with CRC shown in the line 400. The decoding metric obtained for the subset composed of the first and second control channel elements of the group of control channel elements will have then a low value. The result "010" corresponds to the data formed by coded and modulated information combined with CRC shown in the line 400. The decoding metric, obtained for the subset composed of the third and fourth control channel elements of the group of control channel elements, will have then a high value.

Thus, there is no more erroneous sorting from highest to lowest decoding metrics of control channel elements or groups of control channel elements as the decoding metric determined for the subset composed of the third and fourth control channel elements of the group of control channel elements has a higher value than the decoding metrics determined for the third and fourth control channel elements of the group of control channel elements.

It has to be noted here that, the example of the FIG. 4 uses only coded and modulated information combined with CRC having a length of three bits for the sake of simplicity but we can understand that coded and modulated information combined with CRC, in practice, are represented by a larger number of bits.

FIG. 5 depicts the different operations executed by a first telecommunication device and a second telecommunication device on control channel elements according to a second mode of realisation of the present invention.

According to the second mode of realisation, one subset of at least one randomisation function is associated to each possible number of control channel elements allocated or susceptible to be allocated by the first telecommunication device BS to a second telecommunication device UE.

Each subset of at least one randomisation function comprises a number of randomisation functions which is equal to the number of control channel elements of the group of control channel elements.

Each randomisation function has a given position in the subset of at least one randomisation function.

The randomisation function at a position in the subset of at least one randomisation function is the randomisation function used for processing the data to be included in the control channel element having the same position in the group of control channel elements as the position of the randomisation function in the subset of at least one randomisation function.

A subset of at least one randomisation function is then defined according to the randomisation functions it comprises and the respective positions of the randomisation functions it comprises.

Two subsets of randomisation functions are identical if they comprise the same randomisation functions at the same positions.

The randomisation function or all randomisation functions of a subset of at least one randomisation function used for processing the data mapped or intended to be mapped on control channel element or elements on subsets of at least one control channel element can not be equal to the randomisation function or functions used for processing the data mapped or intended to be mapped on control channel element or elements having the same position in the group of control channel elements, the randomisation function or functions belonging to another subset of at least one randomisation function associated to subsets of the same or a larger number of control channels elements.

When plural second telecommunication devices UE are comprised in a coverage area 50 of the first telecommunication device BS, one subset of at least one randomisation function is associated to each possible number of control channel elements allocated by the first telecommunication device BS to one second telecommunication device UE and to each second telecommunication device UE.

Each subset of at least one randomisation function, associated to each second telecommunication device UE, is different from each subset of at least one randomisation function associated to the other second telecommunication devices UE.

The FIG. 5 discloses the different operations executed when the randomisation functions are scrambling sequences in an example where one or two control channel elements can be allocated to each second telecommunication device UE.

In the example of the FIG. 5, two control channel elements are allocated to each second telecommunication device UE1 and UE2.

The operations, shown in lines 500 to 502, are executed by the first telecommunication device BS and the operations shown in lines 503 to 506 by the second telecommunication device UE2.

The line 500 shows data formed by coded and modulated information combined with CRC.

The line 501 shows examples of scrambling sequences used as masks. It has to be noted here that different scrambling sequences are allocated to a given second telecommunication device UE. Each scrambling sequence is determined for second telecommunication device UE according to the number of control channel elements allocated to the second telecommunication device UE and according to the position of the control channel elements within the group of control channel elements. When plural second telecommunication devices UE are comprised in coverage area 50, each scrambling sequence is determined according to the second telecommunication device UE to which the scrambling sequence is allocated.

The line 502 shows the result of the scrambling by the first telecommunication device BS of the data formed by the coded and modulated information combined with CRC by scrambling sequences determined as disclosed previously, as example using a Boolean exclusive OR. The scrambled data are mapped on the control channel elements.

The lines 503 and 505 show the de-scrambling sequences determined by the second telecommunication device UE2, for de-scrambling or masking the data formed by the coded and modulated information combined with CRC, according to an expected number of control channel elements allocated to the second telecommunication device UE2.

The lines 504 and 506 show the result of the de-scrambling, by the second telecommunication device UE2, of the coded and modulated information combined with CRC by the de-scrambling sequences respectively shown in lines 503 and 505.

The intersections of the lines 500 to 502 and the column 507 show the operation executed by the first telecommunication device BS for the first control channel element allocated to the second telecommunication device UE1 and the intersections of the lines 500 to 502 and the column 508 show the operation executed by the first telecommunication device BS for the second control channel element allocated to the second telecommunication device UE1.

The intersections of the lines 400 to 402 and the column 509 show the operation executed by the first telecommunication device BS for the third control channel element allocated to the second telecommunication device UE2 and the intersections of the lines 400 to 402 and the column 510 show the operation executed by the first telecommunication device BS for the fourth control channel element allocated to the second telecommunication device UE2.

It has to be noted here that, according to the example of the FIG. 5, the control channel elements are consecutive but the control channel elements are not necessarily consecutive in the present invention.

According to the second mode of realisation of the present invention, each selected scrambling sequence is selected according to the number of control channel elements allocated or susceptible to be allocated to one destination and according to the position of allocated or susceptible to be allocated control channel element within the group of control channel elements and according to the destination.

The scrambling sequence "101", shown in the intersections of column 507 and line 501, is the scrambling sequence selected for the control channel element having the first position in the group of control channel elements when the control channel element is comprised in a subset of two control channel elements allocated to the second telecommunication device UE1.

The scrambling sequence "001", shown in the intersections of column 508 and line 501, is the scrambling sequence selected for the control channel element having the second position in the group of control channel elements when the control channel element is comprised in a subset of two control channel elements allocated to the second telecommunication device UE1.

The scrambling sequence "111", shown in the intersections of column 509 and line 501, is the scrambling sequence selected for the control channel element having the third position in the group of control channel elements when the control channel element is comprised in a subset of two control channel elements allocated to the second telecommunication device UE2.

The scrambling sequence "011", shown in the intersections of column 510 and line 501, is the scrambling sequence selected for the control channel element having the fourth position in the group of control channel elements when the control channel element is comprised in a subset of two control channel elements allocated to the second telecommunication device UE2.

According to the example of the FIG. 5, the first telecommunication device BS intends to map in the first control channel element allocated to the second telecommunication device UE1 the coded and modulated information combined with CRC '001', masks it by the scrambling sequence '101' and obtains the value '100' which is mapped on the first control channel element allocated to the second telecommunication device UE1.

The first telecommunication device BS intends to map on the second control channel element allocated to the second telecommunication device UE1 the duplicated coded and modulated information combined with CRC '001', masks it by the scrambling sequence '001' and obtains the value '000' which is mapped on the second control channel element allocated to the second telecommunication device UE1.

The first telecommunication device BS intends to map on the third control channel element allocated to the second telecommunication device UE2 the coded and modulated information combined with CRC '010', masks it by the scrambling sequence '111' and obtains the value '101' which is mapped on the third control channel element allocated to the second telecommunication device UE2.

The first telecommunication device BS intends to map on the fourth control channel element allocated to the second telecommunication device UE2 the duplicated coded and modulated information combined with CRC '010', masks it by the scrambling sequence '011' and obtains the value '001', which is mapped on the fourth control channel element allocated to the second telecommunication device UE2.

Each second telecommunication device UE receives all the data mapped on the control channel elements.

Each second telecommunication device UE multiplies the received data mapped on each control channel element which is susceptible to be allocated to it by the scrambling sequence which corresponds to one allocated control channel element and which corresponds to the position of the control channel element within the group of control channel elements.

The scrambling sequence "100", shown in the intersection of the column 507 and line 503, is the scrambling sequence which corresponds to the first control channel element of the group of control channel elements which is expected to be allocated to the second telecommunication device UE2.

The scrambling sequence "011", shown in the intersection of the column 508 and line 503, is the scrambling sequence which corresponds to the second control channel element of the group of control channel elements which is expected to be allocated to the second telecommunication device UE2.

The scrambling sequence "110", shown in the intersection of the column 509 and line 503 is the scrambling sequence which corresponds to the third control channel element of the group of control channel elements which is expected to be allocated to the second telecommunication device UE2.

The scrambling sequence "111", shown in the intersection of the column 510 and line 503, is the scrambling sequence which corresponds to the fourth control channel element of the group of control channel elements which is expected to be allocated to the second telecommunication device UE2.

The line 504 shows the result of the masking executed by the second telecommunication device UE2 on the respective received data mapped on each received control channel element.

As it is shown in the line 504, none of the results "000" or "011" or "011" or "110" correspond to the data formed by coded and modulated information combined with CRC shown in the line 500. The decoding metric obtained for each control channel element will have then a low value.

Each second telecommunication device UE multiplies the received data mapped on each control channel element of each possible subset of at least one control channel element which is susceptible to be allocated to it by one scrambling sequence which corresponds to the number of control channel elements comprised in the subset of at least one control channel element and which corresponds to the position of the control channel element within the group of control channel elements.

The scrambling sequence "010" shown in the intersection of the column 507 and line 505 is the scrambling sequence which corresponds to the first control channel element of the group of control channel elements when a subset of two control channel elements are allocated to the second telecommunication device UE2.

The scrambling sequence "000" shown in the intersection of the column 508 and line 505 is the scrambling sequence which corresponds to the second control channel element of the group of control channel elements when a subset of two control channel elements are allocated to the second telecommunication device UE2.

The scrambling sequence "111" shown in the intersection of the column 509 and line 505 is the scrambling sequence which corresponds to the third control channel element of the group of control channel elements when a subset of two control channel elements are allocated to the second telecommunication device UE2.

The scrambling sequence "011" shown in the intersection of the column 510 and line 505 is the scrambling sequence which corresponds to the fourth control channel element of the group of control channel elements when a subset of two control channel elements are allocated to the second telecommunication device UE2.

The line 506 shows the result of the masking executed by the second telecommunication device UE2 on the respective received data mapped on each received control channel element.

As it is shown in the line 506, the results "110" and "000" do not correspond to the data formed by coded and modulated information combined with CRC shown in the line 500. The decoding metric obtained for the subset composed of the first and second control channel elements will have then a low value. The result "010" corresponds to the data formed by coded and modulated information combined with CRC shown in the line 500. The decoding metric obtained for the subset composed of the third and fourth control channel elements will have then a high value.

It has to be noted here that, the example of the FIG. 5 uses only coded and modulated information combined with CRC having a length of three bits for the sake of simplicity but we can understand that coded and modulated information combined with CRC, in practice, are represented by a larger number of bits.

FIG. 6 depicts the different operations executed by a first telecommunication device and a second telecommunication device on control channel elements according to a third mode of realisation of the present invention.

According to the third mode of realisation, one subset of at least one randomisation function is associated to each possible number of control channel elements allocated or susceptible to be allocated by the first telecommunication device BS to a second telecommunication device UE.

Each subset of at least one randomisation function comprises a number of randomisation functions which is equal to the number of control channel elements in the subset of at least one control channel elements allocated or susceptible to be allocated to the second telecommunication device UE.

Each randomisation function has a given position in the subset of at least one randomisation function.

The randomisation function at a position in the subset of at least one randomisation function is the randomisation function used for processing the data to be included or included in the control channel element having the same position in the allocated or susceptible to be allocated subset of at least one control channel element as the position of the randomisation function in the subset of at least one randomisation function.

A subset of at least one randomisation function is then defined according to the randomisation functions it comprises and the respective positions of the randomisation functions it comprises.

Two subsets of randomisation functions are identical if they comprise the same randomisation functions at the same positions.

When plural second telecommunication devices UE are comprised in a coverage area 50 of the first telecommunication device BS, one subset of at least one randomisation function is associated to each possible number of control channel elements allocated by the first telecommunication device BS to one second telecommunication device UE and to each second telecommunication device UE.

Each subset of at least one randomisation function associated to each second telecommunication device UE is different from each subset of at least one randomisation function associated to the other second telecommunication devices UE.

All randomisation functions in a subset of at least one randomisation function are never consecutive in another subset of at least one randomisation function having a larger number of randomisation functions.

The FIG. 6 discloses the different operations executed when the randomisation functions are scrambling sequences in an example where one or two control channel elements can be allocated to each second telecommunication device UE.

In the example of the FIG. 6, two control channel elements are allocated to each second telecommunication device UE1 and UE2.

The operations shown in lines 600 to 602 are executed by the first telecommunication device BS and the operations shown in lines 603 to 610 by the second telecommunication device UE2.

The line 600 shows data formed by coded and modulated information combined with CRC.

The line 601 shows examples of scrambling sequences used as masks. It has to be noted here that different scrambling sequences are allocated to a given second telecommunication device UE. Each scrambling sequence is determined for one second telecommunication device UE, according to the number of control channel elements allocated to the second telecommunication device UE and according to the position of the control channel elements within the subset of at least one control channel element allocated to the second telecommunication device UE. When plural second telecommunication devices UE are comprised in coverage area 50, each scrambling sequence is determined according to the second telecommunication device UE to which the scrambling sequence is allocated.

The line 602 shows the result of the scrambling by the first telecommunication device BS of the data formed by the coded and modulated information combined with CRC by a scrambling sequence determined as disclosed previously, as example using a Boolean exclusive OR. The scrambled data are mapped on the control channel elements.

The lines 603, 605, 607 and 609 show the de-scrambling sequences determined by the second telecommunication device UE2 for de-scrambling the data formed by the coded and modulated information combined with CRC according to an expected number of control channel elements allocated to the second telecommunication device UE2.

The lines 604, 606, 608 and 610 show the result of the de-scrambling, by the second telecommunication device UE2, of the coded and modulated information combined with CRC by the de-scrambling sequences respectively shown in lines 603, 605, 607 and 609.

The intersections of the lines 600 to 602 and the column 611 show the operation executed by the first telecommunication device BS for the first control channel element allocated to the second telecommunication device UE1 and the intersections of the lines 600 to 602 and the column 612 show the operation executed by the first telecommunication device BS for the second control channel element allocated to the second telecommunication device UE1.

The intersections of the lines 600 to 602 and the column 613 show the operation executed by the first telecommunication device BS for the third control channel element allocated to the second telecommunication device UE2 and the intersections of the lines 600 to 602 and the column 614 show the operation executed by the first telecommunication device BS for the fourth control channel element allocated to the second telecommunication device UE2.

It has to be noted here that, according to the example of the FIG. 6, the control channel elements are consecutive but the control channel elements are not necessarily consecutive in the present invention.

The scrambling sequence "1101" shown in the intersections of column 611 and line 601 is the scrambling sequence selected for the control channel element having the first position in the subset of two control channel elements allocated to the second telecommunication device UE1.

The scrambling sequence "1001" shown in the intersections of column 612 and line 601 is the scrambling sequence selected for the control channel element having the second position in the subset of two control channel elements allocated to the second telecommunication device UE1.

The scrambling sequence "0111" shown in the intersections of column 613 and line 601 is the scrambling sequence selected for the control channel element having the first position in the subset of two control channel elements allocated to the second telecommunication device UE2.

The scrambling sequence "0011" shown in the intersections of column 614 and line 601 is the scrambling sequence selected for the control channel element having the second position in the subset of two control channel elements allocated to the second telecommunication device UE2.

According to the example of the FIG. 6, the first telecommunication device BS intends to map in the first control channel element allocated to the second telecommunication device UE1 the coded and modulated information combined with CRC '0001', masks it by the scrambling sequence '1101' and obtains the value '1100' which is mapped on the first control channel element allocated to the second telecommunication device UE1.

The first telecommunication device BS intends to map on the second control channel element allocated to the second telecommunication device UE1 the duplicated coded and modulated information combined with CRC '0001', masks it by the scrambling sequence '1001' and obtains the value '1000' which is mapped on the second control channel element allocated to the second telecommunication device UE1.

The first telecommunication device BS intends to map on the third control channel element allocated to the second telecommunication device UE2 the coded and modulated information combined with CRC '0010', masks it by the scrambling sequence '0111' and obtains the value '0101' which is mapped on the third control channel element allocated to the second telecommunication device UE2.

The first telecommunication device BS intends to map on the fourth control channel element allocated to the second telecommunication device UE2 the duplicated coded and modulated information combined with CRC '0010', masks it by the scrambling sequence '0011' and obtains the value '0001' which is mapped on the fourth control channel element allocated to the second telecommunication device UE2.

Each second telecommunication device UE receives all the data mapped on the control channel elements.

According to the third mode of realisation, if a single control channel element is allocated to a second telecommunication device UE, the same scrambling sequence used for multiplying the data mapped in each second channel element of the group of control channel elements received by the second telecommunication device UE as the scrambling sequence is selected according to the position of allocated or susceptible to be allocated control channel element within a subset of one control channel.

The scrambling sequence "1100" shown in the line 603 is the scrambling sequence which corresponds to one control channel element which is expected to be allocated to the second telecommunication device UE2.

The line 604 shows the result of the masking executed by the second telecommunication device UE2 on the respective received data mapped on each received control channel element.

As it is shown in the line 604, none of the results "0000" or "0100" or "1001" or "1101" correspond to the data formed by coded and modulated information combined with CRC shown in the line 600. The decoding metric obtained for each control channel element will have then a low value.

Each second telecommunication device UE multiplies the received data mapped on each control channel element of each possible subset of at least one control channel element which is susceptible to be allocated to it by its scrambling sequence which corresponds to the number of control channel elements comprised in the subset and which corresponds to the position of the control channel element within the subset of at least one control channel element.

The scrambling sequence "0111" shown in the intersection of the column 611 and line 605 is the scrambling sequence which corresponds to the first control channel element of the subset of at least one control channel element when a subset of two control channel elements are allocated to the second telecommunication device UE2.

The scrambling sequence "0011" shown in the intersection of the column 612 and line 605 is the scrambling sequence which corresponds to the second control channel element of the subset of at least one control channel element when a subset of two control channel elements are allocated to the second telecommunication device UE2.

The line 606 shows the result of the masking executed by the second telecommunication device UE2 on the respective received data mapped on each received control channel element.

As it is shown in the line 606, the results "0111" and "1011" do not correspond to the data formed by coded and modulated information combined with CRC shown in the line 600.

The decoding metric obtained for the subset composed of the first and second control channel elements of the group of control channel elements will have then a low value.

The scrambling sequence "0111" shown in the intersection of the column 612 and line 607 is then used for the second control channel element of the group of control channel elements instead of the sequence "0011" as explained previously.

It has to be noted here that, the example of the FIG. 6 uses only coded and modulated information combined with CRC having a length of four bits for the sake of simplicity but we can understand that coded and modulated information combined with CRC, in practice, are represented by a larger number of bits.

FIG. 7 depicts the different operations executed by a first telecommunication device and a second telecommunication device on control channel elements according to a fourth mode of realisation of the present invention.

According to the fourth mode of realisation, one subset of at least one randomisation function is associated to each possible number of control channel elements allocated or susceptible to be allocated by the first telecommunication device BS to a second telecommunication device UE and to each possible position of the allocated or susceptible to be allocated control channel elements within the group of control channel elements.

Each subset of at least one randomisation function comprises a number of randomisation functions which is equal to the number of control channel elements in the subset of at least one control channel element allocated or susceptible to be allocated to the second telecommunication device.

Each randomisation function has a given position in the subset of at least one randomisation function.

The randomisation function at a position in the subset of at least one randomisation function is the randomisation function used for processing the data to be included or included in the control channel element having the same position in the allocated or susceptible to be allocated subset of at least one control channel element as the position of the randomisation function in the subset of at least one randomisation function.

A subset of at least one randomisation function is then defined according to the randomisation functions it comprises and the respective positions of the randomisation functions it comprises.

Two subsets of randomisation functions are identical if they comprise the same randomisation functions at the same positions.

When plural second telecommunication devices UE are comprised in a coverage area 50 of the first telecommunication device BS, one subset of at least one randomisation function is associated to each possible number of control channel elements allocated by the first telecommunication device BS to one second telecommunication device UE and to each possible position of control channel elements allocated by the first telecommunication device BS to one second telecommunication device UE and to each second telecommunication device UE.

Each subset of at least one randomisation function associated to each second telecommunication device UE is different from each subset of at least one randomisation function associated to the other second telecommunication devices UE.

The randomisation function or all randomisation functions of a subset of at least one randomisation function used for processing the data mapped or intended to be mapped on control channel element or elements on a associated subset of at least one control channel element can not be equal to the randomisation function or functions used for processing the data mapped or intended to be mapped on control channel element or elements having the same position in the group of control channel elements, the randomisation function or functions belonging to another subset of at least one randomisation function associated to a subset of at least one control channel element having the same or a larger number of control channels elements.

The FIG. 7 discloses the different operations executed when the randomisation functions are scrambling sequences in an example where one or two control channel elements can be allocated to each second telecommunication device UE.

In the example of the FIG. 7, two control channel elements are allocated to each second telecommunication device UE1 and UE2.

The operations shown in lines 700 to 702 are executed by the first telecommunication device BS and the operations shown in lines 703 to 710 by the second telecommunication device UE2.

The line 700 shows data formed by coded and modulated information combined with CRC.

The line 701 shows examples of scrambling sequences used as masks. It has to be noted here that different scrambling sequences are allocated to a given second telecommunication device UE.

Each scrambling sequence is determined for one second telecommunication device UE, according to the number of control channel elements allocated to the second telecommunication device UE, according to the position of the control channel elements within the subset of at least one control channel element allocated to the second telecommunication device UE and according to the position of each control channel element allocated to the second telecommunication device UE within the group of control channel elements. When plural second telecommunication devices UE are comprised in coverage area 50, each scrambling sequence is determined according to the second telecommunication device UE to which the scrambling sequence is allocated.

The line 702 shows the result of the scrambling by the first telecommunication device BS of the data formed by the coded and modulated information combined with CRC by a scrambling sequence determined as disclosed previously, as example using a Boolean exclusive OR. The scrambled data are mapped on the control channel elements.

The lines 703, 705, 707 and 709 show the de-scrambling sequences determined by the second telecommunication device UE2 for de-scrambling or masking the data formed by the coded and modulated information combined with CRC according to an expected number of control channel elements allocated to the second telecommunication device UE2.

The lines 704, 706, 708 and 710 show the result of the de-scrambling, by the second telecommunication device UE2, of the coded and modulated information combined with CRC by the de-scrambling sequences respectively shown in lines 703, 705, 707 and 709.

The intersections of the lines 700 to 702 and the column 711 show the operation executed by the first telecommunication device BS for the first control channel element allocated to the second telecommunication device UE1 and the intersections of the lines 700 to 702 and the column 712 show the operation executed by the first telecommunication device BS for the second control channel element allocated to the second telecommunication device UE1.

The intersections of the lines 700 to 702 and the column 713 show the operation executed by the first telecommunication device BS for the third control channel element allocated to the second telecommunication device UE2 and the intersections of the lines 700 to 702 and the column 714 show the operation executed by the first telecommunication device BS for the fourth control channel element allocated to the second telecommunication device UE2.

It has to be noted here that, according to the example of the FIG. 7, the control channel elements are consecutive but the control channel elements are not necessarily consecutive in the present invention.

The scrambling sequence "1101" shown in the intersections of column 711 and line 701 is the scrambling sequence selected for the control channel element having the first position in the subset of two control channel elements allocated to the second telecommunication device UE1 and the first position in the group of control channel elements.

The scrambling sequence "1001" shown in the intersections of column 712 and line 701 is the scrambling sequence selected for the control channel element having the second position in the subset of two control channel elements allocated to the second telecommunication device UE1 and the second position in the group of control channel elements.

The scrambling sequence "0111" shown in the intersections of column 713 and line 701 is the scrambling sequence selected for the control channel element having the first position in the subset of two control channel elements allocated to the second telecommunication device UE2 and the third position in the group of control channel elements.

The scrambling sequence "0011" shown in the intersections of column 714 and line 701 is the scrambling sequence selected for the control channel element having the second position in the subset of two control channel elements allocated to the second telecommunication device UE2 and the fourth position in the group of control channel elements.

According to the example of the FIG. 7, the first telecommunication device BS intends to map in the first control channel element allocated to the second telecommunication device UE1 the coded and modulated information combined with CRC '0001', masks it by the scrambling sequence '1101' and obtains the value '1100' which is mapped on the first control channel element allocated to the second telecommunication device UE1.

The first telecommunication device BS intends to map on the second control channel element allocated to the second telecommunication device UE1 the duplicated coded and modulated information combined with CRC '0001', masks it by the scrambling sequence '1001' and obtains the value '1000' which is mapped on the second control channel element allocated to the second telecommunication device UE1.

The first telecommunication device BS intends to map on the third control channel element allocated to the second telecommunication device UE2 the coded and modulated information combined with CRC '0010', masks it by the scrambling sequence '0111' and obtains the value '0101' which is mapped on the third control channel element allocated to the second telecommunication device UE2.

The first telecommunication device BS intends to map on the fourth control channel element allocated to the second telecommunication device UE2 the duplicated coded and modulated information combined with CRC '0010', masks it by the scrambling sequence '0011' and obtains the value '0001' which is mapped on the fourth control channel element allocated to the second telecommunication device UE2.

Each second telecommunication device UE receives all the data mapped on the control channel elements.

According to the fourth mode of realisation, if a single control channel element is allocated to a second telecommunication device UE, different scrambling sequences are used for multiplying the data mapped on each control channel element of the group of control channel elements received by the second telecommunication device UE. These scrambling sequences are determined according to the position of the control channel element within the group of control channel elements.

The scrambling sequence "1100" shown in the intersection of the column 711 and the line 703 is the scrambling sequence which corresponds to the first control channel element of the group of control channel elements which is expected to be allocated to the second telecommunication device UE2.

The scrambling sequence "0101" shown in the intersection of the column 712 and the line 703 is the scrambling sequence which corresponds to the second control channel element of the group of control channel elements which is expected to be allocated to the second telecommunication device UE2.

The scrambling sequence "0110" shown in the intersection of the column 713 and the line 703 is the scrambling sequence which corresponds to the third control channel element of the group of control channel elements which is expected to be allocated to the second telecommunication device UE2.

The scrambling sequence "1111" shown in the intersection of the column 714 and the line 703 is the scrambling sequence which corresponds to the fourth control channel element of the group of control channel elements which is expected to be allocated to the second telecommunication device UE2.

The line 704 shows the result of the masking executed by the second telecommunication device UE2 on the respective received data mapped on each received control channel element.

As it is shown in the line 704, none of the results "0000" or "1101" or "0011" or "1110" correspond to the data formed by coded and modulated information combined with CRC shown in the line 700. The decoding metric obtained for each control channel element will have then a low value.

Each second telecommunication device UE multiplies the received data mapped on each control channel element of each possible subset of at least one control channel element which is susceptible to be allocated to it by one scrambling sequence which corresponds to number of control channel elements comprised in the subset of control channel element and which corresponds to the position of the control channel element within the subset of at least one control channel element and which corresponds to the position of the control channel element within the group of control channel elements.

The scrambling sequence "0110" shown in the intersection of the column 711 and line 705 is the scrambling sequence which corresponds to the first control channel element of the subset of at least one control channel element when a subset of two control channel elements are allocated to the second telecommunication device UE2 and corresponds to the first control channel element of the group of control channel elements.

The scrambling sequence "0011" shown in the intersection of the column 712 and line 705 is the scrambling sequence which corresponds to the second control channel element of the subset of at least one control channel element when a subset of two control channel elements are allocated to the second telecommunication device UE2 and corresponds to the second control channel element of the group of control channel elements.

The line 706 shows the result of the masking executed by the second telecommunication device UE2 on the respective received data mapped on each received control channel element.

As it is shown in the line 606, the results "0110" and "1011" do not correspond to the data formed by coded and modulated information combined with CRC shown in the line 700. The decoding metric obtained for the subset composed of the first and second control channel elements of the group of control channel elements will have then a low value.

The scrambling sequence "0100" shown in the intersection of the column 712 and line 707 is then used for the second control channel element of the group of control channel elements instead of the sequence "0011" and corresponds to the first control channel element of the subset of at least one control channel element.

It has to be noted here that, the example of the FIG. 7 uses only coded and modulated information combined with CRC having a length of four bits for the sake of simplicity but we can understand that coded and modulated information combined with CRC, in practice, are represented by a larger number of bits.

FIG. 10 depicts an algorithm executed by the first telecommunication device according to the present invention.

More precisely, the present algorithm is executed by the processor 200 of the first telecommunication device.

At step S1000, the processor 200 selects at least one destination in order to allocate to it at least one control channel element (CCE). The or each destination is a second telecommunication device UE and/or at least one application executed by at least one second telecommunication device UE. As example, the processor 200 selects the second telecommunication devices UE1 and UE2.

At next step S1001, the processor 200 selects a first destination. As example, the processor 200 selects the second telecommunication device UE1.

At next step S1002, the processor 200 checks if the information comprised in the control channel element to be allocated to the selected destination needs to be repeated. If the information comprised in the control channel element to be allocated to the destination needs to be repeated, the processor 200 moves to step S1004. Otherwise, the processor 200 moves to step S1003.

According to the example of the FIG. 1, the second telecommunication device UE1 is far from the first telecommunication device BS, the processor 200 moves then to step S1004.

At step S1004, the processor 200 determines the number of times the information comprised in the control channel element to be allocated to the destination needs to be repeated.

At step S1005, the processor 200 allocates the determined number of control channel elements to the selected destination.

After that, the processor 200 moves to step S1006 and checks if all the destinations selected at step S1000 have been processed. If all the destinations selected at step S1000 have been processed, the processor 200 moves to step S1008. Otherwise, the processor 200 moves to step S1007.

At step S1007, the processor 200 selects another destination and executes the loop constituted by the steps S1002 to S1006 as far as all the destinations selected at step S1000 have been processed.

It has to be noted here that in a variant, the steps S1004 and S1000 are executed at the same time at the initial step of the present algorithm.

At step S1008, the processor 200 determines information for each control channel element. The information are, as example, representative of the channel coding, like convolutional or turbo coding, and/or of the modulation scheme and/or of a location of a subset of the group of channel elements and/or of a space time code to be used by the second telecommunication device UE to which the control channel element is allocated.

At next step S1009, the processor 200 calculates, for each information, a cyclic redundancy checksum (CRC) of the information. In a variant the CRC is calculated by the wireless interface 206.

At next step S1010, the processor 200 commands the wireless interface 206 in order to encode each information combined with CRC and commands at step S1011 the wireless interface 206 in order to modulate each encoded information combined with CRC.

At next step S1012, the processor 200 selects the control channel element which is at the first position in the group of control channel elements.

At next step S1013, the processor 200 identifies the second telecommunication device UE to which the selected control channel element is allocated.

At next step S1014, the processor 200 identifies the number of control channel elements in the subset of at least one control channel element allocated to the second telecommunication device UE identified at step S1013.

At next step S1015, the processor 200 identifies the position, within the group of control channel elements, of each control channel element allocated to the second telecommunication device UE identified at step S1013 and/or identifies the position, within the subset of at least one control channel element, of each control channel element allocated to the second telecommunication device UE identified at step S1013.

At next step S1016, the processor 200 selects the randomisation function to be applied on the data formed by the modulated and encoded information combined with CRC for the selected control channel element. The randomisation function, like a scrambling sequence or an interleaving function, is selected according to the first or second or third or fourth mode of realisation of the present invention as disclosed in reference to the FIGS. 4 to 7.

At next step S1017, the processor 200 processes the modulated and encoded information combined with CRC by the selected randomisation function.

At next step S1018, the processor 200 checks if all the control channel elements have been processed. If all the control channel elements have been processed, the processor 200 moves to step S1020. Otherwise, the processor 200 moves to step S1019 and selects the following control channel element in the group of control channel elements.

The processor 200 executes the loop constituted by the steps S1013 to S1019 as far as all the control channel elements have been processed.

At step S1020, the processor 200 maps each processed data on the respective control channel elements which are then transferred.

It has to be noted here that, when a destination is an application executed by a given second telecommunication device UE, the processor 200 may select at least two applications executed by the same second telecommunication device UE.

FIG. 11 depicts an algorithm executed by each second telecommunication device according to the present invention.

More precisely, the present algorithm is executed by the processor 300 of each second telecommunication device UE.

At step S1100, the processor 300 is informed by the wireless interface 306, of the reception of the received data mapped on the control channel elements.

At next step S1101, the processor 300 selects a first subset of at least one control channel element CCE among the one disclosed in the example of the FIG. 8.

At next step S1102, the processor 300 obtains, for the selected control channel element or for each control channel element of the selected subset, a randomisation function. The randomisation function is a de-scrambling sequence or a de-interleaving function.

For each control channel element, the processor 300 reads from the RAM memory or the ROM memory the randomisation function which corresponds to the number of control channel elements selected at step S1101. According to some modes of realisation of the present invention, the processor 300 reads, from the RAM memory or the ROM memory, the randomisation function which corresponds also to the position, within the group of control channel elements, of the control channel element and/or which corresponds to the position, within the subset of at least one control channel element, of the control channel element.

At next step S1103, the processor 300 commands the wireless interface 306 in order to process the received data mapped on the selected control channel element or elements by the randomisation function or functions obtained at step S1102.

At next step S1104, the processor 300 determines an accumulation on at least a part of the symbols comprised in each selected control channel element at step S1101.

The FIG. 9 discloses an example of symbols comprised in each control channel element of the group of control channel elements in an example wherein the group of control channel elements comprises six control channel elements.

In the example of the FIG. 9, the group of control channel elements comprises six control channel elements CCE1 to CCE6. Each control channel element is composed of four symbols.

The symbols shown in the FIG. 9 are symbols after the processing of the received data. When the randomisation function is a de-interleaving function, the symbols shown in the FIG. 9 have been de-interleaved.

The control channel element CCE2 is composed of the symbols $S_{1_{CCE2}}$ to $S_{4_{CCE2}}$, the control channel element CCE3 is composed of the symbols $S_{1_{CCE3}}$ to $S_{4_{CCE3}}$, the control channel element CCE4 is composed of the symbols $S_{1_{CCE4}}$ to $S_{4_{CCE4}}$ and the control channel element CCE5 is composed of the symbols $S_{1_{CCE5}}$ to $S_{4_{CCE5}}$.

As example, if at step S1101, a subset composed of the control channel elements CCE2 to CCE5 is selected, the processor 300 executes an accumulation of at least a part of the four symbols having the same position after the processing of the received data.

As example, if a partial accumulation is executed on the two first symbols for the control channel elements CCE2 to CCE5, the processor 300 executes an accumulation of the first symbol $S_{1_{CCE2}}$ of the control channel element CCE2, of the first symbol $S_{1_{CCE3}}$ of the control channel element CCE3, of the first symbol $S_{1_{CCE4}}$ of the control channel element CCE4 and of the first symbol $S_{1_{CCE5}}$ of the control channel element CCE5. The processor 300 executes an accumulation of the second symbol $S_{2_{CCE2}}$ of the control channel element CCE2, of the second symbol $S_{2_{CCE3}}$ of the control channel element CCE3, of the second symbol $S_{2_{CCE4}}$ of the control channel element CCE4 and of the second symbol $S_{2_{CCE5}}$ of the control channel element CCE5.

If a complete accumulation is executed, the processor 300 determines an accumulation for the control channel elements CCE2 to CCE5 by executing an accumulation of the first symbol $S_{1_{CCE2}}$ of the control channel element CCE2, of the first symbol $S_{1_{CCE3}}$ of the control channel element CCE3, of the first symbol $S_{1_{CCE4}}$ of the control channel element CCE4 and of the first symbol $S_{1_{CCE5}}$ of the control channel element CCE5. The processor 300 executes an accumulation of the second symbol $S_{2_{CCE2}}$ of the control channel element CCE2, of the second symbol $S_{2_{CCE3}}$ of the control channel element CCE3, of the second symbol $S_{2_{CCE4}}$ of the control channel element CCE4 and of the second symbol $S_{2_{CCE5}}$ of the control channel element CCE5. The processor 300 executes an accumulation of the third symbol $S_{3_{CCE2}}$ of the control channel element CCE2, of the third symbol $S_{3_{CCE3}}$ of the control channel element CCE3, of the third symbol $S_{3_{CCE4}}$ of the control channel element CCE4 and of the third symbol $S_{3_{CCE5}}$ of the control channel element CCE5. The processor 300 executes an accumulation of the fourth symbol $S_{4_{CCE2}}$ of the control channel element CCE2, of the fourth symbol $S_{4_{CCE3}}$ of the control channel element CCE3, of the fourth symbol $S_{4_{CCE4}}$ of the control channel element CCE4 and of the fourth symbol $S_{4_{CCE5}}$ of the control channel element CCE5.

In case of an additive white Gaussian noise channel (AWGN), the accumulation is an addition. In case of a fading channel, the accumulation is a maximum ratio combining (MRC) and symbol-by-symbol equalisation (by a scalar) is performed. The equalisation may be zero-forcing, minimum mean square error combining (MMSEC), equal-gain combining (EGC) or MRC.

At next step S1105, the processor 300 commands the wireless interface 306 in order to execute demodulation of the results of the accumulation step.

The demodulation is partial or complete according to the accumulation step.

At next step S1106, the processor 300 commands the wireless interface 306 in order to execute a decoding metric computation step on the demodulated symbols, wherein the decoding metric increases with the adequacy of the demodulated processed received data and the code structure.

As example, in case of Viterbi decoding, the decoding metric is the sum of squares or variance of the metrics on at least a part of the trellis states after a few Viterbi decoding steps or is the best metric among at least a part of the trellis states after a few Viterbi decoding steps or is the sum or the mean of the metrics on at least a part of the trellis states after a few Viterbi decoding steps or is the number of different states in the survivor paths at Viterbi decoding step $N_{step}-X$ after a few Viterbi decoding steps $N_{step}$. Thanks to code structure properties, the number of different states should be equal to 1 if X is high enough compared to the constraint length of the code.

At step S1107, the processor 300 normalizes the decoding metrics determined at step S1106.

If the decoding metrics are the sum of squares or variance or the best metric or the sum or the mean of the metrics as cited above, with multi-path channel, these metrics are of the form $B \cdot Y + N_0$ where B depends on the multi-path channel characteristics (for instance B may be the sum of the equivalent channel coefficients experienced by the coded bits), $N_0$ is the noise variance of the additive noise experienced by the decoding metric.

In order to obtain comparable normalized metrics Y for different subsets $N_0$ can be subtracted from the decoding metric and the result is then divided by B.

At next step S1108, the processor 300 checks if there is at least one subset of at least one control channel element which has not been processed.

If there is at least one subset of at least one control channel element which has not been processed, the processor 300 moves to step S1109, selects another subset of at least one control channel element and returns to step S1102.

If all the subsets of control channel elements have been processed, the processor 300 moves to step S1110.

At step S1110, the processor 300 orders the normalized metrics from the largest normalized metric to the lowest normalized metric.

At next step S1111, the processor 300 selects the largest normalized results with the corresponding subset of at least one control channel element from which the selected normalized metric is calculated.

At next step S1112, the processor 300 commands the wireless interface 306 in order to complete the accumulations, demodulations and decoding if the accumulations, demodulations and decoding have been executed at steps S1104, S1105 and 1106 on a part of the symbols and if the accumulations have been memorized.

If the decoding results have not been memorized, the processor 300 commands the wireless interface 306 in order to execute accumulations, demodulations and decoding of the symbols comprised in each selected control channel element at step S1111.

It has to be noted here that if at step S1104, decoding results of all the symbols comprised in each selected control channel element at step S1111 have been executed and memorized, the processor 300 doesn't execute the step S1112 and moves to step S1115.

At next step S1115, the processor 300 calculates a cyclic redundancy checksum of the demodulated and decoded result of the accumulation step. In a variant, the cyclic redundancy checksum is calculated by the wireless interface 306.

At next step S1116, the processor 300 checks the cyclic redundancy. If the cyclic redundancy is correct, the processor 300 moves to step S1119, the information transferred to the second telecommunication device UE is localized and decoded.

If the cyclic redundancy is not correct, the processor 300 moves to step S1117, and checks if there are some remaining normalized metrics which have not been processed.

It has to be noted here that, all the subsets of at least one control channel element from which the ordered normalized metrics are determined, are processed or only the subsets of at least one control channel element from which ordered normalized metrics which are higher than a value are processed or only the subsets of at least one control channel element from which a predetermined number of ordered normalized metrics are determined are processed.

If the result of the test of step S1117 is positive, the processor 300 moves to step S1118, selects the subset of at least one control channel element from which the following normalized metric is determined and executes the loop constituted by the steps S1112 to S1118 as far as the test of step S1117 is negative.

If the test of step S1117 is negative, the processor 300 stops the present algorithm and returns to step S1100.

The present invention has been described in an example wherein the processes are executed on control channel element.

The present invention is also applicable on classical channel elements. Such case occurs as example, when no control channel elements are defined in the telecommunication network. In such case, the first and second telecommunication devices apply the present invention on the channel elements in which are included data.

FIG. 12 depicts an algorithm executed by each second telecommunication device according to a variant of the present invention.

If the scrambling sequence can be represented by a binary scrambling sequence, the algorithm as disclosed in the FIG. 11 is modified.

Instead of performing the demodulation at step S1104 in the loop constituted by the steps S1102 to S1108, the demodulation for all the control channel elements is performed prior to the loop constituted by the steps S1203 to S1209.

The step S1200 is identical to the step S1100.

At step S1201 the demodulation for all the control channel elements is performed and Log Likehood ratios are determined.

At the same step, the wireless interface 306 proceeds to a channel equalization.

The steps S1202 to S1204 are identical to the steps S1101 to S1103, they will be no more described.

At step S1205, the processor 300 commands the wireless interface 306 in order to proceed to an accumulation of at least a part of the Log Likehood ratios of the subset of at least one control channel element under process.

The steps S1206 to S1211 are identical to the steps S1106 to S1111, they will be no more described.

At step 1212, the processor 300 commands the wireless interface 306 in order to complete the accumulations and decoding if accumulations and decoding have been executed at step S1205 on a part of the Log Likehood ratios and if the decoding results have been memorized.

If the decoding results have not been memorized, the processor 300 commands the wireless interface 306 in order to execute accumulations and decoding of all the Log Likehood ratios of the subset of at least one control channel element under process.

It has to be noted here that if at step S1205, accumulations and decoding of all the symbols comprised in each selected control channel element at step S1211 have been executed and memorized, the processor 300 doesn't execute the step S1212 and moves to step S1215.

The steps S1215 to S1219 are identical to the steps S1115 to S1119, they will be no more described.

Naturally, many modifications can be made to the embodiments of the invention described above without departing from the scope of the present invention.

The invention claimed is:

1. A method for allocating, by a telecommunication device, at least a channel element of a group of channel elements of a channel resource to a destination, each channel element being a predefined subdivision of the channel resource, the method executed by the telecommunication device comprising the steps of:
   determining the number of channel elements to be allocated to the destination;
   selecting at least one randomisation function from a plurality of randomisation functions according to the number of channel elements to be allocated to the destination, at least two randomisation functions from the plurality of randomisation functions corresponding to two different numbers of channel elements being different for a given channel element;
   processing the data to be included in the or each channel element to be allocated to the destination by the at least one selected randomisation function; and
   transferring the data processed by the at least one selected randomisation function by mapping the data processed by the at least one randomisation function on the at least one channel element.

2. The method according to claim 1, wherein the randomisation functions are scrambling sequences and the processes of the data are multiplications.

3. The method according to claim 1, wherein the randomisation functions are interleaving functions and the processes of the data are permutations.

4. The method according to any one of claims 1 to 3, wherein plural channel elements are allocated to the destination, one randomisation function is selected and in that, the data to be included in each channel element to be allocated to the destination are processed by the selected randomisation function.

5. The method according to claim 4, wherein the method is executed for plural destinations, one randomisation function is selected for each destination and each randomisation function is further selected according to the destination.

6. The method according to any one of the claims 1 to 3, wherein one channel element is allocated to the destination, one randomisation function is selected and in that the selected randomisation function is further selected according to the position of the allocated channel element within the group of channel elements.

7. The method according to claim 6, wherein the method is executed for plural destinations, one randomisation function is selected for each destination and each randomisation function is further selected according to the destination.

8. The method according to any one of the claims 1 to 3, wherein plural channel elements are allocated to the destination, for each channel element allocated to the destination, one randomisation function is selected, each selected randomisation function is further selected according to the position of the channel element for which the randomisation function is selected within the group of channel elements.

9. The method according to claim 8, wherein the method is executed for plural destinations, plural randomisation functions are selected and each randomisation function is further selected according to the destination.

10. The method according to any one of the claims 1 to 3, wherein plural channel elements of a subset of channel elements are allocated to the destination, for each channel element allocated to the destination, one randomisation function is selected, and wherein each selected randomisation function is further selected according to the position of the channel element within the subset of channel elements.

11. The method according to claim 10, wherein the method is executed for plural destinations, plural randomisation functions are selected and each randomisation function is further selected according to the destination.

12. The method according to any one of the claims 1 to 3, wherein plural channel elements of a subset of channel elements are allocated to the destination, for each channel element allocated to the destination, one randomisation function is selected, and in that each selected randomisation function is further selected according to the position of the channel element within the subset of channel elements and according to the position of each channel element allocated to the destination within the group of channel elements.

13. The method according to claim 12, wherein the method is executed for plural destinations, plural randomisation functions are selected and each randomisation function is further selected according to the destination.

14. The method according to claim 1, wherein the data are formed by modulating and coding information combined with a cyclic redundancy of the information.

15. The method according to claim 14, wherein the destination is another telecommunication device or an application executed by the other telecommunication device.

16. The method according to claim 15, wherein the channel elements are control channel elements and the data are representative of a modulation and/or a coding scheme to be used by the destination for a subset of the group of channel elements and/or a location of a subset of the group of channel elements and/or a space time code to be used by the destination for a subset of the group of channel elements.

17. The method according to claim 1, wherein the channel elements allocated to one destination are consecutive channel elements in the group of channel elements.

18. A device for allocating at least a channel element of a group of channel elements of a channel resource to a destination, each channel element being a predefined subdivision of the channel resource, the device comprises:
   means for determining the number of channel elements to be allocated to the destination;
   means for selecting at least one randomisation function from a plurality of randomization functions according to the number of channel elements to be allocated to the destination, at least two randomisation functions from the plurality of randomisation functions corresponding to two different numbers of channel elements being different for a given channel element;
   means for processing the data to be included in the or each channel element to be allocated to the destination by the at least one selected randomisation function; and
   means for transferring the data processed by the at least one selected randomisation function by mapping the data processed by the at least one randomisation function on the at least one channel element.

19. A non-transitory computer readable storage medium, having instructions stored therein, which when executed by a processor in a telecommunication device causes the processor to execute a method for allocating, by a telecommunication device, at least a channel element of a group of channel elements of a channel resource to a destination, each channel element being a predefined subdivision of the channel resource, the method comprising:

determining the number of channel elements to be allocated to the destination;

selecting at least one randomisation function from a plurality of randomisation functions according to the number of channel elements to be allocated to the destination, at least two randomisation functions from the plurality of randomisation functions corresponding to two different numbers of channel elements being different for a given channel element;

processing the data to be included in the or each channel element to be allocated to the destination by the at least one selected randomisation function; and transferring the data processed by the at least one selected randomisation function by mapping the data processed by the at least one randomisation function on the at least one channel element.

* * * * *